(12) United States Patent
Kitamura et al.

(10) Patent No.: US 7,314,297 B2
(45) Date of Patent: Jan. 1, 2008

(54) VEHICLE LIGHTING APPARATUS

(75) Inventors: Ryohei Kitamura, Wako (JP); Hiroyasu Ota, Wako (JP); Shigeru Kodaira, Wako (JP); Hirotoshi Noguchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/284,234

(22) Filed: Nov. 21, 2005

(65) Prior Publication Data

US 2006/0109670 A1  May 25, 2006

(30) Foreign Application Priority Data

Nov. 24, 2004  (JP) ............... 2004-338973

(51) Int. Cl.
*B62J 6/02* (2006.01)
(52) U.S. Cl. ............ 362/475; 362/544; 362/473; 362/525
(58) Field of Classification Search ............... None
See application file for complete search history.

(56) References Cited

U.S. PATENT DOCUMENTS

| | | | | |
|---|---|---|---|---|
| 3,099,400 | A * | 7/1963 | Holmes | 362/476 |
| D271,529 | S * | 11/1983 | Ziver | D26/118 |
| 4,937,710 | A * | 6/1990 | Hurley et al. | 362/547 |
| 5,003,446 | A * | 3/1991 | Nagengast et al. | 362/294 |
| 5,599,085 | A * | 2/1997 | Tabata et al. | 362/475 |
| 5,611,612 | A * | 3/1997 | Choji et al. | 362/459 |
| 5,647,659 | A | 7/1997 | Mori | |
| 6,210,014 | B1 * | 4/2001 | Kubizne et al. | 362/96 |
| 6,419,382 | B1 | 7/2002 | Nakagawa et al. | |
| 6,439,753 | B1 | 8/2002 | Sumada et al. | |
| 6,547,426 | B1 * | 4/2003 | Ebara | 362/473 |
| 2003/0133310 | A1 * | 7/2003 | VanDuyn et al. | 362/547 |
| 2004/0094347 | A1 | 5/2004 | Kakizoe | |
| 2005/0036331 | A1 * | 2/2005 | Crepeau et al. | 362/516 |

FOREIGN PATENT DOCUMENTS

| | | |
|---|---|---|
| DE | 102 55 443 | 6/2004 |
| EP | 0 895 188 | 8/1998 |
| EP | 0 894 664 | 2/1999 |
| EP | 0 894 699 | 2/1999 |
| GB | 2 327 260 | 1/1999 |
| JP | 07-105701 | 4/1995 |
| JP | 09-150765 | 6/1997 |

* cited by examiner

*Primary Examiner*—Sandra O'Shea
*Assistant Examiner*—Danielle Dunn
(74) *Attorney, Agent, or Firm*—Hamre, Schumann, Mueller & Larson, PC

(57) ABSTRACT

A headlamp unit is provided to emphasize a shape of an individual lamp while suppressing an increase in the number of parts used, while improving ventilation and preventing fogging in areas near an inner surface of a lens, while maintaining a simple housing structure. The headlamp unit including a high beam lamp and a low beam lamp arranged vertically. The high beam lamp and the low beam lamp are disposed on upper and lower portions, respectively. The headlamp unit including an area between the high beam lamp and the low beam lamp covered with a lamp to lamp transverse portion of a front cowl, and an area near each of lenses including an air vent hole disposed so as to face a space between the two lenses. The headlamp unit may further include a moisture conditioning member disposed on an inside of the lamp housing.

3 Claims, 16 Drawing Sheets

VEHICLE LIGHTING APPARATUS

FIELD

The present invention relates to a lighting apparatus for vehicles applicable to a motorcycle or the like and, more particularly, to a technique for preventing fogging of an inner surface of a lens.

BACKGROUND

A vertically arranged two lamp lighting apparatus for vehicles having a high beam lamp and a low beam lamp has conventionally been known (see, for example, Japanese Patent No. 3447451). Such a lighting apparatus is constructed as follows. Specifically, a lens body having a lens corresponding to either a high-beam lamp or a low-beam lamp is mounted to a housing main body to form a lamp housing. An individual bulb and an individual reflector are disposed in the lamp housing and the high-beam lamp and low-beam lamp are fitted in a vertical row arrangement. The conventional lighting apparatus thereby reduces the number of parts used as compared with a structure having a separate lamp housing for each of the two different types of lamps (high-beam and low-beam).

As such, a vehicle lighting apparatus may be constructed by forming a lamp housing by mounting a lens body, including a lens, to a housing main body and disposing a bulb and the like in the lamp housing to form a lamp. To prevent a lens inner surface from being fogged due to moisture in the lamp housing evaporating, a typical vehicle lighting apparatus includes an air vent hole disposed in the lamp housing and an air vent pipe connected to the air vent hole on an outside. (See, for example, Japanese Patent No. 3335228.)

In the former structure cited above, however, a single lens body forms the lens corresponding to each of the two different types of lamps (high-beam and low-beam). However, this particular configuration hampers emphasizing the shape of each individual lens and the shape of each individual lamp. Thus, it is difficult to enhance a degree of freedom in designing such a lighting apparatus.

For example, an enhanced degree of freedom is enhanced by a reflector headlight including a multi reflector having a plurality of cut surfaces for light distribution formed on a reflection surface thereof, and a clear lens which has not undergone lens cutting. In such a headlight, brightness of the reflector surface is emphasized and therefore an enhanced degree of freedom in design is provided.

Fog on the inner surface of such a lens is relatively easy to notice. Therefore, it is important in a lamp combining a multi reflector with a clear lens, to ensure good ventilation performance in areas near the inner surface of the lens.

However, in an effort to ensure good ventilation, enlarging the air vent hole or increasing the number of the air vent holes, makes it difficult to design the air vent hole. Similarly, making the air vent pipe project outside the lamp housing contributes to a complicated housing structure.

BRIEF SUMMARY

It is an object of the present invention to provide a vehicle lighting apparatus that can emphasize the shape of each individual lamp, while preventing an increase in the number of parts required. It is another object of the present invention to provide a vehicle lighting apparatus that can further emphasize design of the lamp, while ensuring good ventilation performance in areas near the lens inner surface without making it difficult to design the air vent hole. Yet another object of the present invention is to provide a vehicle lighting apparatus that can prevent the lens inner surface from fogging, while keeping the housing structure simplified.

To achieve the foregoing object, the present invention is a lighting apparatus for vehicles having a high beam lamp and a low beam lamp arranged vertically, characterized in that the high beam lamp and the low beam lamp are disposed on an upper portion and a lower portion, respectively; and that an area between the high beam lamp and the low beam lamp is covered with a cowling.

In accordance with these arrangements, an increase in the number of parts used is prevented, as compared with the arrangement in which each of the lamps is provided with an individual lamp housing. It is also possible to let each of the high beam lamp and the low beam lamp assume an independent appearance. It should be noted that placing the high beam lamp on the upper portion and the low beam lamp on the lower portion is advantageous in illuminating a remote distance with the high beam lamp or a road surface immediately ahead of the vehicle with the low beam lamp.

In the present invention, a lens for the low beam lamp is narrower vertically and wider horizontally. A wide range of a road surface forward of the vehicle in the lateral direction can therefore be illuminated, while widening of an illumination light in the vertical direction in a low beam mode can be suppressed.

In the present invention, a lens for the high beam lamp is disposed at a central portion of the cowling and is circular in a front view thereof. This arrangement makes it easier to distribute an illumination light of the high beam lamp toward a remote distance.

DETAILED DESCRIPTION

Figure 1:
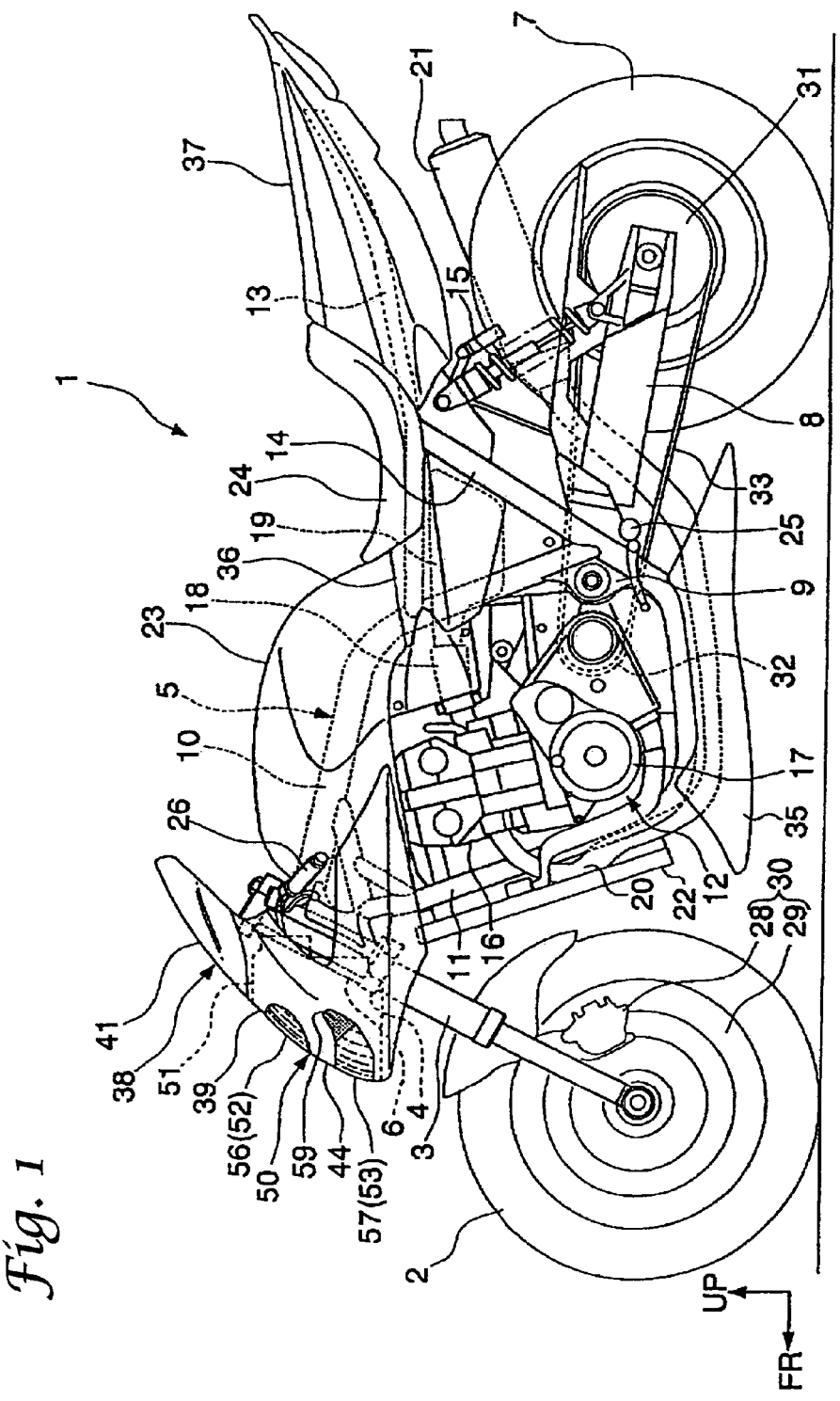
FIG. 1 is a side elevational view showing a motorcycle according to a first possible embodiment of the present invention.

In the present invention, a pair of lamps (for example, left and right headlamps 151, 152) is arranged horizontally and an area near a lens of each lamp (for example, left and right lenses 154, 155) includes an air vent hole (for example, left and right air vent holes 181, 182) disposed so as to face a space between the two lenses. The air vent hole is provided for preventing an inner surface of the lens from fogging.

In accordance with these arrangements, ventilation performance of the areas near the inner surfaces of the lenses can be further enhanced without causing any difficulty in designing the air vent holes, as compared with an arrangement in which the housing main bodies include the air vent holes formed away from the lenses. Specifications of the air vent holes, if provided for the lenses of the headlamps, can be made identical to each other. Further, if the air vent holes are provided for air vent pipes, or the like, in a connected row arrangement, performance in laying out the air vent valves can be enhanced. In particular, if the lamps share a single lamp housing, fogging of the inner surfaces of the lenses can be prevented with a single air vent hole.

The present invention is a lighting apparatus for vehicles (for example, a headlamp unit 250), comprising: a lamp housing (for example, a lamp housing 262) for accommodating a bulb (for example, a bulb 266) and a reflector (for example, a reflector 268); and a lens (for example, a lens 255) disposed on a front surface of the lamp housing, characterized in that a moisture conditioning member (for example, moisture conditioning members 294, 295) is disposed inside the lamp housing.

In accordance with these arrangements, by simply disposing the moisture conditioning member at any arbitrary position inside the lamp housing, fogging of the inner surface of the lens, due to evaporation of moisture inside the lamp housing, can be favorably prevented without making the housing structure complicated.

In the present invention, the moisture conditioning member is disposed in a bulb mounting hole (for example, a valve mounting hole 291) in the lamp housing. This facilitates replacement of the moisture conditioning member and makes the moisture conditioning member hard to see from an outside of the lamp housing.

In the present invention, the moisture conditioning member is a sheet form affixed to the inside of the lamp housing. This enhances a degree of freedom in disposition of the moisture conditioning member inside the lamp housing, while maintaining minimal size and weight of the lamp housing.

According to the present invention, the shape of each individual lamp can be enhanced and the degree of freedom in design can be improved, while suppressing the increase in the number of parts used.

According to the present invention, an optimum illumination range can be easily set for the low beam mode and the high beam mode.

According to the present invention, fogging of the inner surface of the lens can be effectively prevented by ensuring a good ventilation performance in areas near the inner surface of the lens of each lamp, thereby further enhancing design performance of each lamp and facilitating design of the air vent hole.

According to the present invention, reduction in size and weight of the housing structure can be promoted, while keeping structure simplified. Fogging of the inner surface of the lens can be favorably prevented.

According to the present invention, an antifogging effect can be favorably maintained by facilitating maintenance, and appearance of the lighting apparatus can be favorably maintained.

According to the present invention, fogging of the inner surface of the lens can be prevented even more effectively and a reduction in size and weight of the lamp housing can be further promoted.

Specific embodiments to which the present invention is applied will be described below with reference to the accompanying drawings. Throughout the descriptions given hereunder, expressions indicating directions including front and rear, and left and right, mean the same directions as those in the vehicle unless otherwise specified. In the drawings, an arrow FR indicates forward of the vehicle, an arrow LH indicates leftward of the vehicle, and an arrow UP indicates upward of the vehicle.

Referring to FIG. 1, Left and Right front forks 3 journaling a front wheel 2 of a motorcycle (vehicle) 1 are steerably pivoted on a head pipe 6 disposed at a front end portion of a vehicle body frame 5 via a steering stem 4. A swing arm 8 journaling a rear wheel 7 has a front end portion pivoted swingably on left and right pivot portions 9 disposed in a middle of the vehicle body frame 5. The vehicle body frame 5 is a double cradle type frame, in which a pair of main frames 10 and a pair of down tubes 11, that branch to the left and right from the head pipe 6, are connected at a point near the corresponding one of the pivot portions 9. An engine 12 of a water cooled parallel four cylinder type, as a prime mover of the motorcycle 1, is mounted at a central portion of the vehicle enclosed by main frames 10 and down tubes 11. A front end portion of each of left and right seat rails 13 is connected to a rear side on an upper portion of each of the main frames 10. An upper end portion of each of left and right side pipes 14 extending obliquely upwardly and rearwardly from a point near the pivot portion 9 is connected to the corresponding one of the seat rails 13 at substantially a central portion thereof. Each of left and right rear cushions 15 is disposed across and between a connection between each of the side pipes 14 and seat rails 13 and the swing arm 8.

A cylinder portion 16 of the engine 12 is disposed in a slightly forwardly inclined position on a crankcase 17. A downstream side of a throttle body 18, corresponding to each of the four cylinders, is connected to a rear portion of the cylinder portion 16. An upstream side of each throttle body 18 is connected to an air cleaner case 19. An exhaust pipe 20, corresponding to each of the four cylinders, is connected to a front portion of the cylinder portion 16. These exhaust pipes 20 are routed through areas forward and downward of the crankcase 17 before converging to form a single pipe which is then connected to a silencer 21 disposed on the right hand side in a rear portion of the vehicle. A radiator 22 for cooling the engine 12 is disposed forward of the engine 12 so as to sandwich the exhaust pipes 20 with the engine 12.

A fuel tank 23, covering an area over the two main frames 10 from above, is supported by the main frames 10. A seat 24, covering an area over the two seat rails 13 from above, is supported by the seat rails 13. Left and Right steps 25 are mounted at points near the corresponding ones of the pivot portions 9. Left and Right handlebars 26 are mounted on corresponding upper portions of the front forks 3. Brake calipers 28 are mounted on corresponding lower portions of the front forks 3. Left and Right brake rotors 29, respectively corresponding to left and right brake calipers 28, are mounted at a hub portion of the front wheel 2. Left and Right front disc brakes 30 are thereby formed. A rear disc brake, not shown, having the same structure as the front disc brake 30, is disposed on the right hand side of the rear wheel 7.

A driven sprocket 31 is disposed on the left hand side of the rear wheel 7. A drive chain 33 is continuously mounted on the driven sprocket 31 and a drive sprocket 32 disposed on the left hand side in the rear of the engine 12. A driving force of the engine 12 can thereby be transmitted to the rear wheel 7.

A front cowl (cowling) 38 provided as a windshield for covering an area around the head pipe 6, is mounted at a front portion of the vehicle body frame 5. An under cowl 35, for covering a lower portion of the engine 12 across a lower portion of the down tubes 11, is mounted on a lower portion of the vehicle body frame 5. A side cover 36 is mounted on either side at the center of the vehicle body frame 5 so as to cover a rear side of an upper portion of each main frame 10 from a corresponding side. Further, a rear cowl 37, covering a rear portion of each of the seat rails 13 so as to cover the same from above, is mounted in a rear portion of the vehicle body frame 5.

Figure 2:
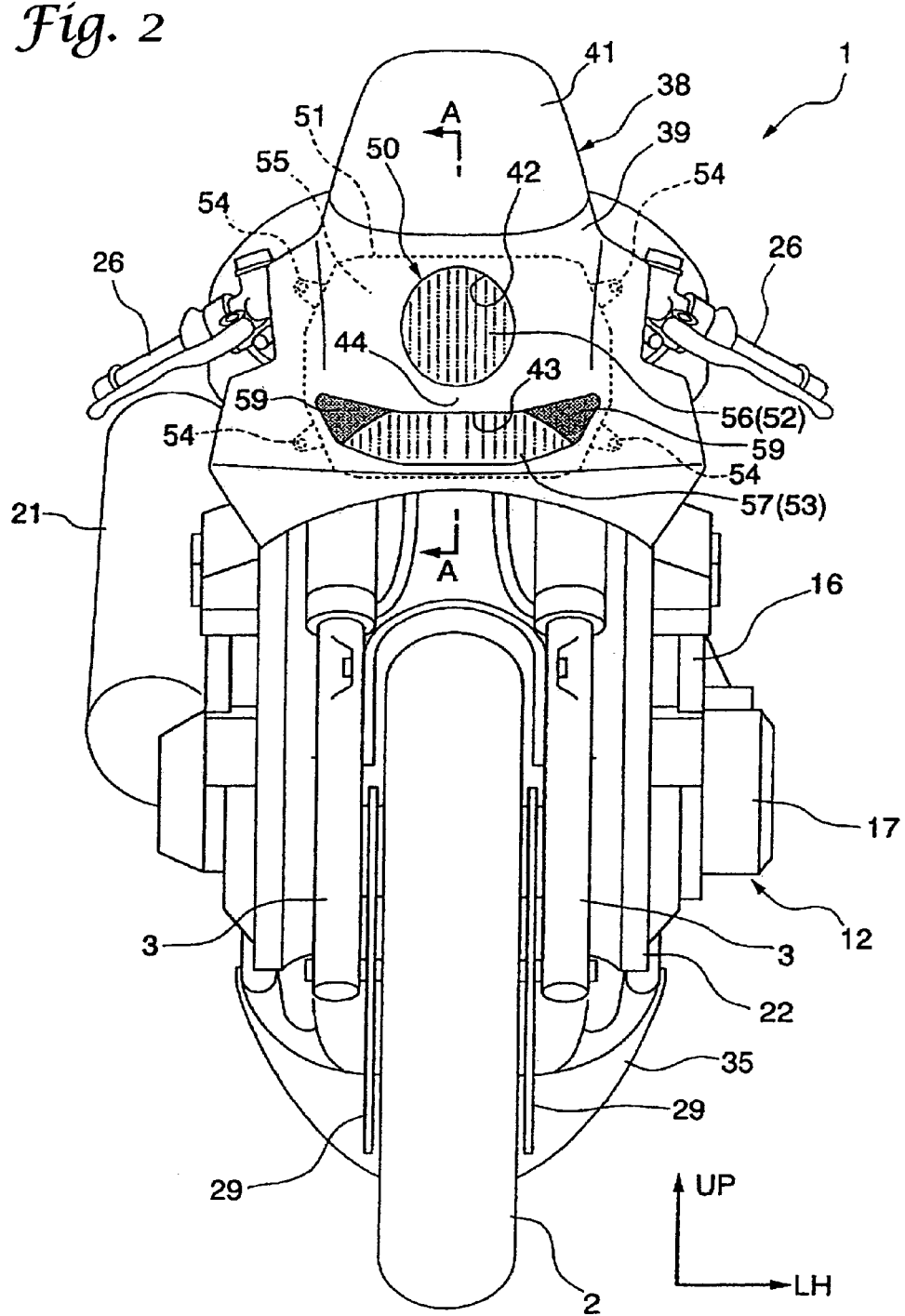
FIG. 2 is a front view showing the motorcycle shown in FIG. 1.

Referring to FIG. 2, the front cowl 38 includes a cowl front wall portion 39 and a screen 41 made of a transparent resin board (polycarbonate or the like) disposed upwardly adjacent to the cowl front wall portion 39. A vertically oriented two lamp headlamp unit (vehicle lighting apparatus) 50 is disposed on an inner side, towards a front direction, of the front cowl 38.

The headlamp unit 50 includes a high beam lamp 52 and a low beam lamp 53 housed in a single lamp housing 51. The high beam lamp 52 is placed on an upper portion of the lamp housing 51 and the low beam lamp 53 is placed on a lower portion of the lamp housing 51. The headlamp unit 50 is secured to the front cowl 38 and the vehicle body frame 5 via a plurality of (four) fixing portions 54, a support stay, not shown, and other fixing portions disposed in the lamp housing 51.

The lamp housing 51 is of a box shape that has substantially a rectangular shape in its front view. A lens 56 for the high beam lamp 52 (hereinafter referred to as an upper portion lens) is disposed at an upper portion of a front wall portion 55 of the lamp housing 51 (hereinafter referred to as a lamp front wall portion). The upper portion lens 56 has a round shape in its front view. A lens 57 for the low beam lamp 53 (hereinafter referred to as a lower portion lens) is disposed downwardly of the upper portion lens 56. The lower portion lens 57 is narrower vertically and wider horizontally.

The cowl front wall portion 39 includes an upper portion opening 42 and a lower portion opening 43, each having a shape substantially identical to the corresponding one of the upper portion lens 56 and the lower portion lens 57. The headlamp unit 50 is disposed such that the upper portion lens 56 and the lower portion lens 57 project toward the front of the vehicle from an inside of the front cowl 38, being exposed through openings 42, 43. In one possible embodiment, the headlamp unit 50 is secured to the vehicle body frame 5 together with the front cowl 38.

The upper portion lens 56 for the high beam lamp 52 is disposed substantially at a center of the front cowl 38 as viewed from the front. The lower portion lens 57 for the low beam lamp 53 is disposed in the same manner as the upper portion lens 56 so as to be symmetrical relative to a vehicle body central plane at a center in a vehicle width direction. Each of the side end portions 59 of the lower portion lens 57 is shaped substantially like a triangle as viewed from the front, an outboard vertex thereof being disposed obliquely upwardly. The side end portions 59 form position lamp lenses disposed in a connected row arrangement with the low beam lamp 53.

Figure 3:
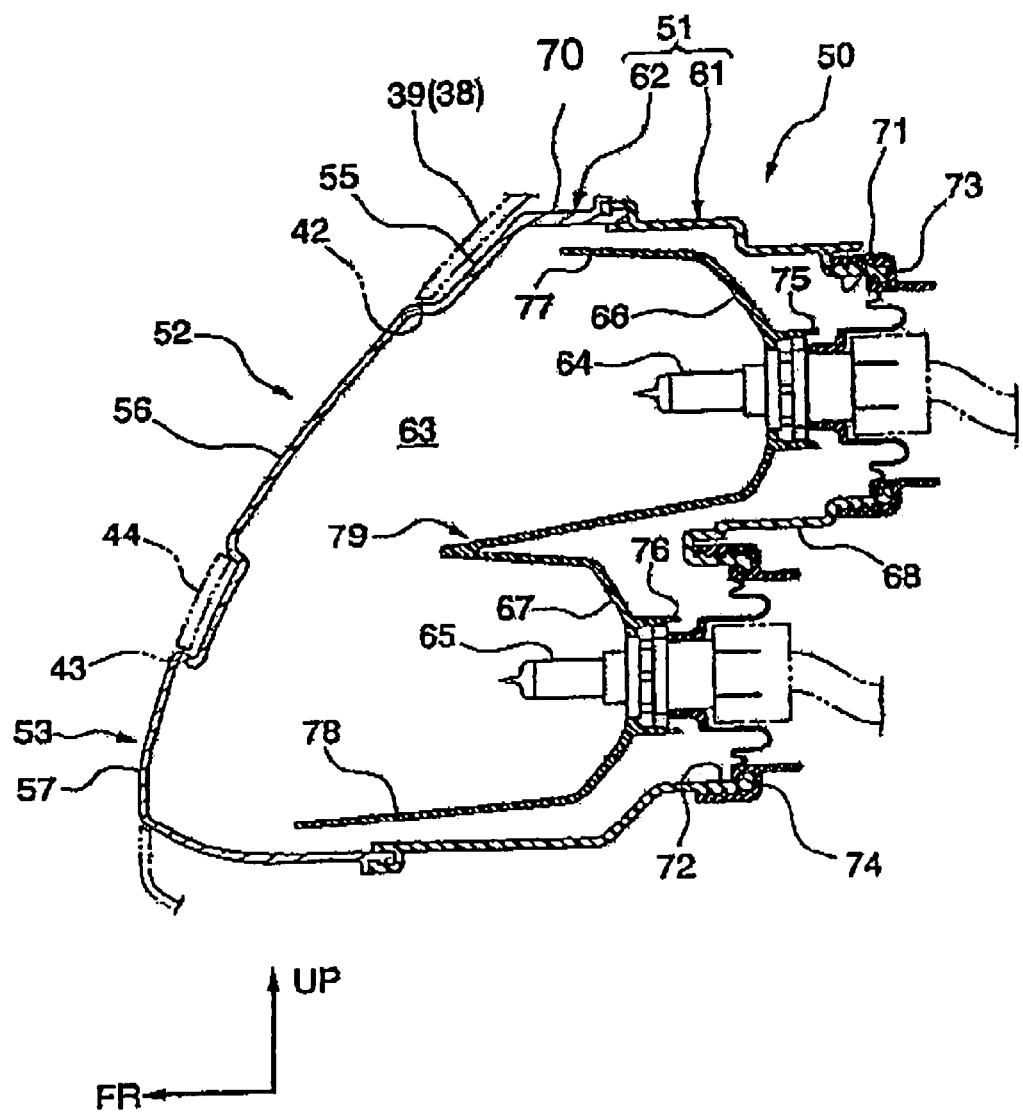
FIG. 3 is a cross sectional view, taken along line A A of FIG. 2.

Referring to FIG. 3, the headlamp unit 50 is formed as detailed in the following. Specifically, the lamp housing 51 primarily includes a housing main body 61 that opens toward the front of the vehicle and a lens body 62 mounted so as to cover the opening. Upper portion and lower portion bulbs 64, 65 respectively corresponding to the high beam lamp 52 and the low beam lamp 53, and upper portion and lower portion reflectors 66, 67 are disposed in a lamp chamber 63 defined by the lamp housing 51. The lamp front wall portion 55 is formed by the lens body 62. The upper portion lens 56 and the lower portion lens 57 are formed on the lamp front wall portion 55.

The cowl front wall portion 39 of the front cowl 38 is inclined such that the higher a portion thereof is located, the more rearward the portion is located. In addition, the cowl front wall portion 39 is curved so as to be protruding obliquely upwardly toward the front. Further, the lamp front wall portion 55 is disposed to be inclined and curved in the same manner as, and so as to follow, the cowl front wall portion 39. The lamp front wall portion 55 is arranged to abut against a backside of the cowl front wall portion 39 via a sealing member, not shown.

The upper portion lens 56 and the lower portion lens 57 are formed to be protruding forwardly relative to a portion of the lamp front wall portion 55 overlapping with the cowl front wall portion 39, such that front surfaces thereof are substantially flush with a front surface of the cowl front wall portion 39. To state it another way, the portion of the lamp front wall portion 55 overlapping with the cowl front wall portion 39 is formed to indent rearwardly relative to the upper portion lens 56 and the lower portion lens 57.

The lens body 62 includes a lens outer peripheral wall portion 70 extending substantially rearwardly from an outer peripheral edge portion of the lamp front wall portion 55. The lens outer peripheral wall portion 70 is disposed throughout an entire circumference. A rear end edge portion of the lens outer peripheral wall portion 70 is watertightly joined to an opening peripheral portion of the housing main body 61 throughout an entire periphery thereof. The lens body 62 and the housing main body 61 are thereby integrally connected together.

Attention is now paid to the position of the upper portion bulb 64 and the upper portion reflector 66 for the high beam lamp 52 located on the upper portion in the lamp housing 51 relative to the position of the lower portion bulb 65, and the lower portion reflector 67 for the low beam lamp 53 located on the lower portion in the lamp housing 51. The upper portion bulb 64 and the upper portion reflector 66 for the high beam lamp 52 are disposed rearwardly relative to the lower portion bulb 65 and the lower portion reflector 67 for the low beam lamp 53, so that there is substantially an identical distance in the fore aft direction between the bulbs 64, 65 and reflectors 66, 67 and the corresponding one of the lenses 56, 57 in the lamp housing 51. In response to such an arrangement of the bulbs 64, 65 and reflectors 66, 67 in the lamp housing 51, the housing main body 61 is formed to change in a stepwise fashion so that an upper portion of a rear wall portion 68 of the housing main body 61 is located rearwardly relative to a lower portion of the rear wall portion 68.

The upper portion and the lower portion of the rear wall portion 68 of the housing main body 61 include upper portion and lower portion access holes 71, 72 formed therein, respectively. The upper portion and lower portion access holes 71, 72 allow the bulbs 64, 65 to be loaded into, or unloaded from, the lamp chamber 63, and power supply connectors to be connected to, or disconnected from, rear portion connectors of the bulbs 64, 65. Upper portion and lower portion waterproof caps 73, 74 for preventing entry of water in the lamp chamber 63 are fitted to the access holes 71, 72, respectively.

Each of the reflectors 66, 67 is shaped like a cup opening generally forwardly. Each of the reflectors 66, 67 includes a bulb insertion hole formed at a central portion thereof. In addition, upper portion and lower portion locking portions 75, 76 are mounted in the rear of the center portions of the reflectors 66, 67. The upper portion and lower portion locking portions 75, 76 engage with corresponding locking flanges of the bulbs 64, 65, thereby capable of holding the bulbs 64, 65 in position, respectively. The reflectors 66, 67 include upper portion and lower portion outer peripheral wall portions 77, 78 extending generally forwardly from outer peripheral edge portions thereof. The upper portion and lower portion outer peripheral wall portions 77, 78 are formed throughout an entire periphery. A lower side portion of the upper portion outer peripheral wall portion 77 and an upper side portion of the lower portion outer peripheral wall portion 78 form a continued portion at a front end edge portion of the lower side and the upper side portions. This constitutes a reflector body 79 that integrates the reflectors 66, 67 together.

Each of the outer peripheral wall portions 77, 78 extends up to a point, at which a joint between the lens body 62 and the housing main body 61 is covered and invisible from an outside of the lamp housing 51. In addition, each of the outer peripheral wall portions 77, 78 constitutes a shield portion for keeping light emitted from each of the lamps 52, 53 from leaking through the lens of the other lamp. The lamp housing 51 also includes an aiming adjustment mechanism, not shown. The aiming adjustment mechanism tiltably moves the reflector body 79 to permit aiming adjustments.

Referring to FIG. 2, a lamp to lamp transverse portion 44 is disposed between the upper portion opening 42 and the lower portion opening 43 in the cowl front wall portion 39. The lamp to lamp transverse portion 44 is formed by piercing the upper portion opening 42 and the lower portion opening 43. As such, the lamp to lamp transverse portion 44 covers a portion between the two lamps 52, 53 in the lamp front wall portion 55 (the portion of the lamp front wall portion 55 overlapping with the cowl front wall portion 39). This arrangement helps make the shape of each individual lens 56 or 57 more emphasized as compared with a case in which the lenses 56, 57 are exposed through a single opening covering an area of each of the lenses 56, 57.

Referring to FIG. 3, each of the reflectors 66, 67 is a multi reflector having a plurality of cut surfaces for light distribution formed on a reflection surface thereof. Each of the lenses 56, 57 is a clear lens which has not undergone lens cutting. Specifically, a bulb light in each of the lamps 52, 53 is reflected off the reflection surface of a corresponding one of the reflectors 66, 67 and distributed. The bulb light is then transmitted through a corresponding one of the lenses 56, 57 to illuminate a forward area of the vehicle.

The upper portion lens 56 is disposed so as to be deviated downwardly from a position right in the front of the upper portion reflector 66. As a result, the cowl front wall portion 39 partly overlaps with an upper portion of the upper portion reflector 66 in its front view. Accordingly, the forward area of the vehicle is illuminated, while the bulb light distributed obliquely upwardly to the front is suppressed. The lower portion lens 57 is disposed so as to cover a range from a position that is substantially in front of the lower portion bulb 65 to a position near a lower end edge of the lamp front wall portion 55. As a result, the cowl front wall portion 39 (the lamp to lamp transverse portion 44) overlaps with substantially an upper half of the lower portion reflector 67, in its front view. This allows the forward area of the vehicle to be illuminated, while substantially suppressing distribution of the bulb light to an obliquely upward area toward the front.

As described in the foregoing, the headlamp unit 50 according to the first embodiment of the present invention includes the high beam lamp 52 and the low beam lamp 53 arranged vertically. The high beam lamp 52 is positioned on the upper portion, while the low beam lamp 53 is positioned on the lower portion. Further, the headlamp unit 50 has part of the front cowl 38 (the lamp to lamp transverse portion 44) covering the area between the two lamps 52, 53.

According to these arrangements, a minimum number of parts are used, as compared with an arrangement in which each of the lamps 52, 53 is provided with a lamp housing 51. The arrangements also make it possible to let each of the high beam lamp 52 and the low beam lamp 53 exhibit an independent appearance. More specifically, the shape of each individual lamp 52 or 53 can be emphasized for the enhanced degree of freedom in design, while suppressing the increase in the number of parts used.

It is noted that placing the high beam lamp 52 on the upper portion and the low beam lamp 53 on the lower portion is advantageous in illuminating a remote distance with the high beam lamp 52 or a road surface immediately ahead of the vehicle with the low beam lamp 53. Specifically, illumination appropriate for each of the two lamps 52, 53 can be made.

In the headlamp unit 50 according to the first embodiment of the present invention, the lower portion lens 57 for the low beam lamp 53 is narrower vertically and wider horizontally. A wide range of a road surface forward of the vehicle in the lateral direction can therefore be illuminated, while widening of an illumination light in the vertical direction in a low beam mode can be suppressed. In addition, the upper portion lens 56 for the high beam lamp 52, having a round shape in its front view, is disposed at the central portion of the front cowl 38. It is therefore easier to distribute the illumination light from the high beam lamp 52 to a remote distance. Specifically, it is easy to set an illumination range appropriate for the low beam mode and high beam mode.

A second preferred embodiment of the present invention will now be described.

Figure 4:
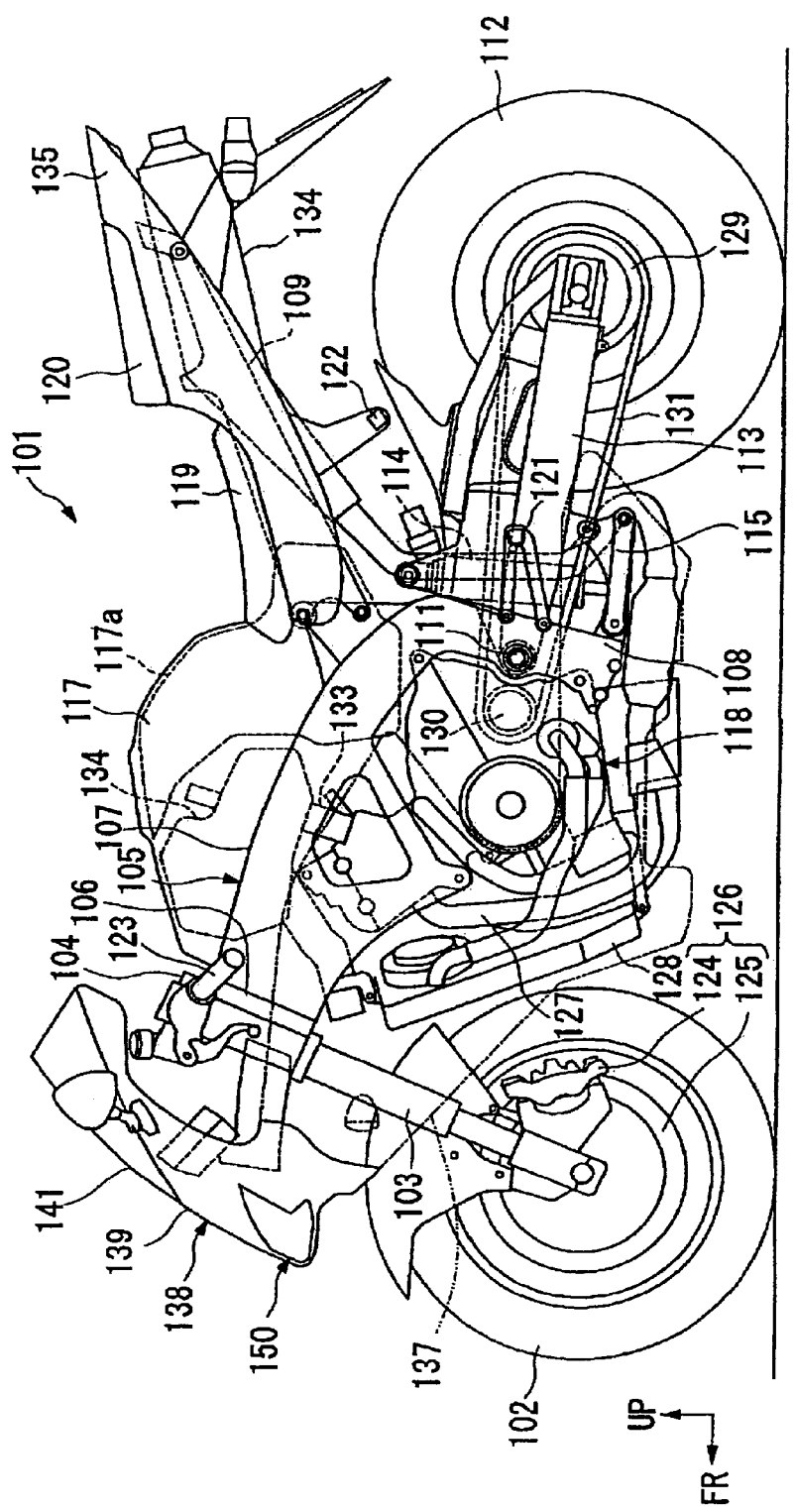
FIG. 4 is a side elevational view showing a motorcycle according to a second possible embodiment of the present invention.

Referring to FIG. 4, a front fork 103 journaling a front wheel 102 of a motorcycle (vehicle) 101 is steerably pivoted on a head pipe 106 disposed at a front end portion of a vehicle body frame 105 via a steering stem 104. A main frame 107 of the vehicle body frame 105 extends obliquely downwardly and rearwardly from the head pipe 106. A rear end portion of the main frame 107 is then bent downwardly to continue to a pivot plate 108. A front end portion of a seat frame 109 is connected to a rear portion of the main frame 107. The seat frame 109 extends obliquely upwardly and rearwardly.

A proximal end portion of a swing arm 113 is swingably mounted to the pivot plate 108 via a pivot 111. A rear wheel 112 is journaled on a distal end portion of the swing arm 113. An upper end portion of a cushion unit 114 is mounted above the proximal end side of the swing arm 113. A lower end portion of the cushion unit 114 is connected to the pivot plate 108 via a linkage mechanism 115 at a position lower in level than the pivot 111.

A fuel tank cover 117 is mounted upward of the main frame 107. An engine 118 of a water cooled in line four cylinder type is mounted downward of the main frame 107. Further, a seat 119 for a rider and a pillion seat 120 for a rear portion passenger are disposed in the rear of the fuel tank cover 117. A step 121 for the rider is mounted in the rear of the pivot plate 108. A step 122 for the rear portion passenger is mounted below the seat frame 109. An air cleaner case 134 and a fuel tank main body 117a are housed under the fuel tank cover 117. The air cleaner case 134 is disposed under a front portion and the fuel tank main body 117a is disposed under a rear portion under the fuel tank cover 117.

A handlebar 123 is mounted on an upper end portion of the front fork 103. A brake caliper 124 is mounted via a caliper bracket on a lower end portion of the front fork 103. A brake disc 125 corresponding to the brake caliper 124 is mounted on a hub portion of the front wheel 102. The brake caliper 124 and the brake disc 125 thus constitute a front disc brake 126 of the motorcycle 101. A rear disc brake, not shown, is disposed on the right hand side of the rear wheel 112. The rear disc brake has the same construction as the front disc brake 126. A rear sprocket 129 is mounted on the left hand side of the rear wheel 112. A drive chain 131 is wound around both the rear sprocket 129 and a drive sprocket 130, disposed on the left hand side in the rear of the engine 118. A driving force of the engine 118 is thereby transmitted to the rear wheel 112.

A downstream side of a throttle body 133 corresponding to each of the four cylinders is connected to a rear portion of a cylinder head of the engine 118. An upstream side of each throttle body 133 is connected to the air cleaner case 134. An exhaust pipe 127 corresponding to each of the four cylinders is connected to a front portion of the cylinder head. These exhaust pipes 127 are routed through areas forward and downward of a crankcase of the engine 118 before converging to form a single pipe. The single pipe is then routed to a point near the seat frame 109 and then connected to a silencer 134 supported by the seat frame 109. A radiator 128 for cooling the engine 118 is disposed forward of the engine 118 so as to sandwich the exhaust pipes 127 with the engine 118.

A rear cowl 135 for covering an area around the seat frame 109 is mounted in a rear portion of the vehicle. A center cowl 137 for covering the engine 118 and an area around a radiator 128 is mounted at a central portion of the vehicle. A front cowl (cowling) 138 for covering an area around the head pipe 106 is mounted at a front portion of the vehicle.

Figure 5:
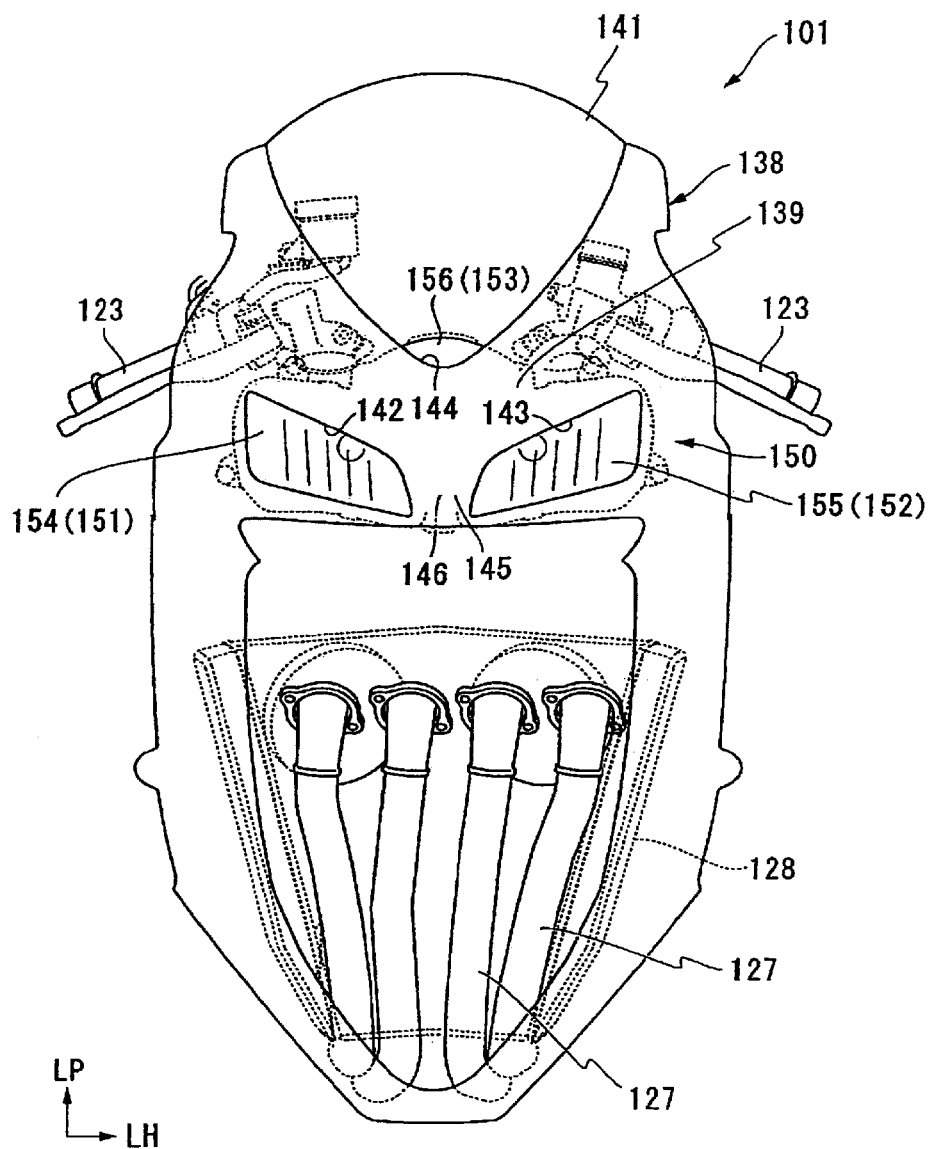
FIG. 5 is a front view showing the motorcycle shown in FIG. 4.

Referring to FIG. 5, the front cowl 138 includes a cowl front wall portion 139 and a screen 141 made of a transparent resin board (polycarbonate or the like) disposed upwardly adjacent to the cowl front wall portion 139. A horizontally oriented two lamp headlamp unit (vehicle lighting apparatus) 150 is disposed on an inside at a front portion of the front cowl 138.

The headlamp unit 150 includes a right headlamp 151, a left headlamp 152, and a position lamp 153. The right headlamp 151 and the left headlamp 152 are disposed on corresponding sides relative to a central plane of the vehicle. The position lamp 153 is disposed upwardly between the two headlamps 151, 152. The cowl front wall portion 139 includes openings 142, 143, 144 that correspond to lenses 154, 155, 156, respectively, of the lamps 151, 152, 153. The headlamp unit 150 is disposed such that the lenses 154, 155, 156 are exposed towards the front of the vehicle through the openings 142, 143, 144, from an inside of the front cowl 138. In one possible embodiment, the headlamp unit 150 is secured to the vehicle body frame 105 with the front cowl 138.

Each of the left and right lenses 154, 155 for the headlamps 151, 152 is narrower vertically and wider horizontally in its front view. Each lens is a deformed rectangle that slants upwardly toward an outboard end in a vehicle width direction. An inner side edge portion of each lens extends obliquely upwardly and outwardly from an inner side end portion at which the lenses 154, 155 are closest together. The inner side edge portion then continues to an upper edge portion of each of the lenses 154, 155. The upper edge portion further extends obliquely upwardly and outwardly and connects to an upper end portion on an outer side edge portion of each of the lenses 154, 155. A lower edge portion of each of the lenses 154, 155 extends obliquely upwardly and outwardly from the inner side end portion and connects to a lower end portion of the outer side edge portion. The outer side edge portion extends obliquely outwardly and upwardly and connects to an outer side portion of the upper edge portion. The cowl front wall portion 139 includes the left and right openings 142, 143, each having a shape substantially identical to the shape of each of the lenses 154, 155.

The center lens 156 for the position lamp 153 is shaped substantially like a leaf of a tree. A lower edge portion of the center lens 156 is curved so as to project downwardly in a front view of the center lens 156, while an upper edge portion thereof is curved so as to project upwardly in the front view of the center lens 156. It is to be noted herein that the screen 141 is disposed such that a lower edge shape of the screen 141 is shaped substantially like the letter V in a front view of the screen 141. A lower end portion of the screen 141 is cut out to form the center opening 144 having substantially the same shape as the center lens 156 in the cowl front wall portion 139.

Figure 6:
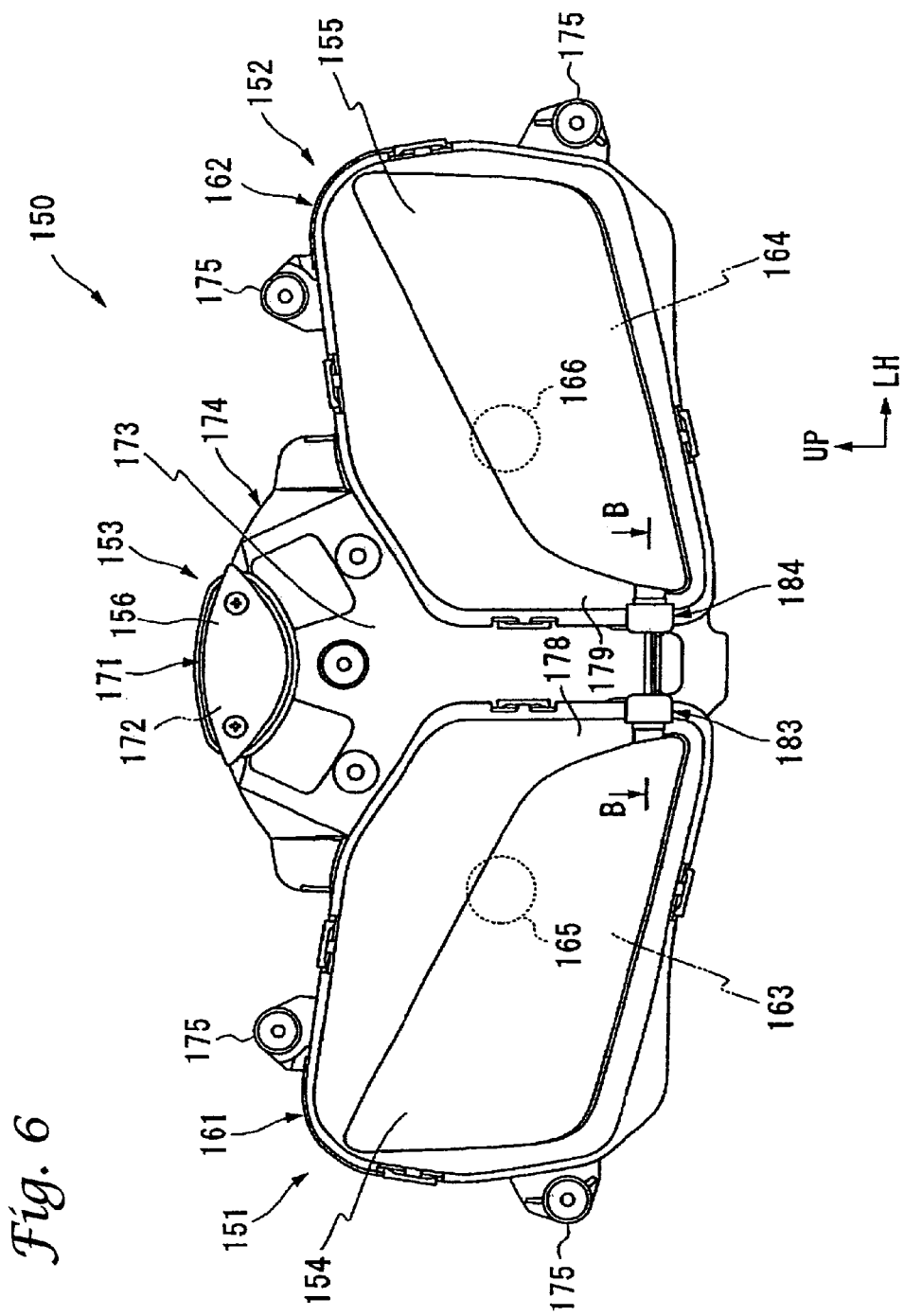
FIG. 6 is a front view showing a headlamp unit of the motorcycle shown in FIGS. 4 and 5.
Figure 7:
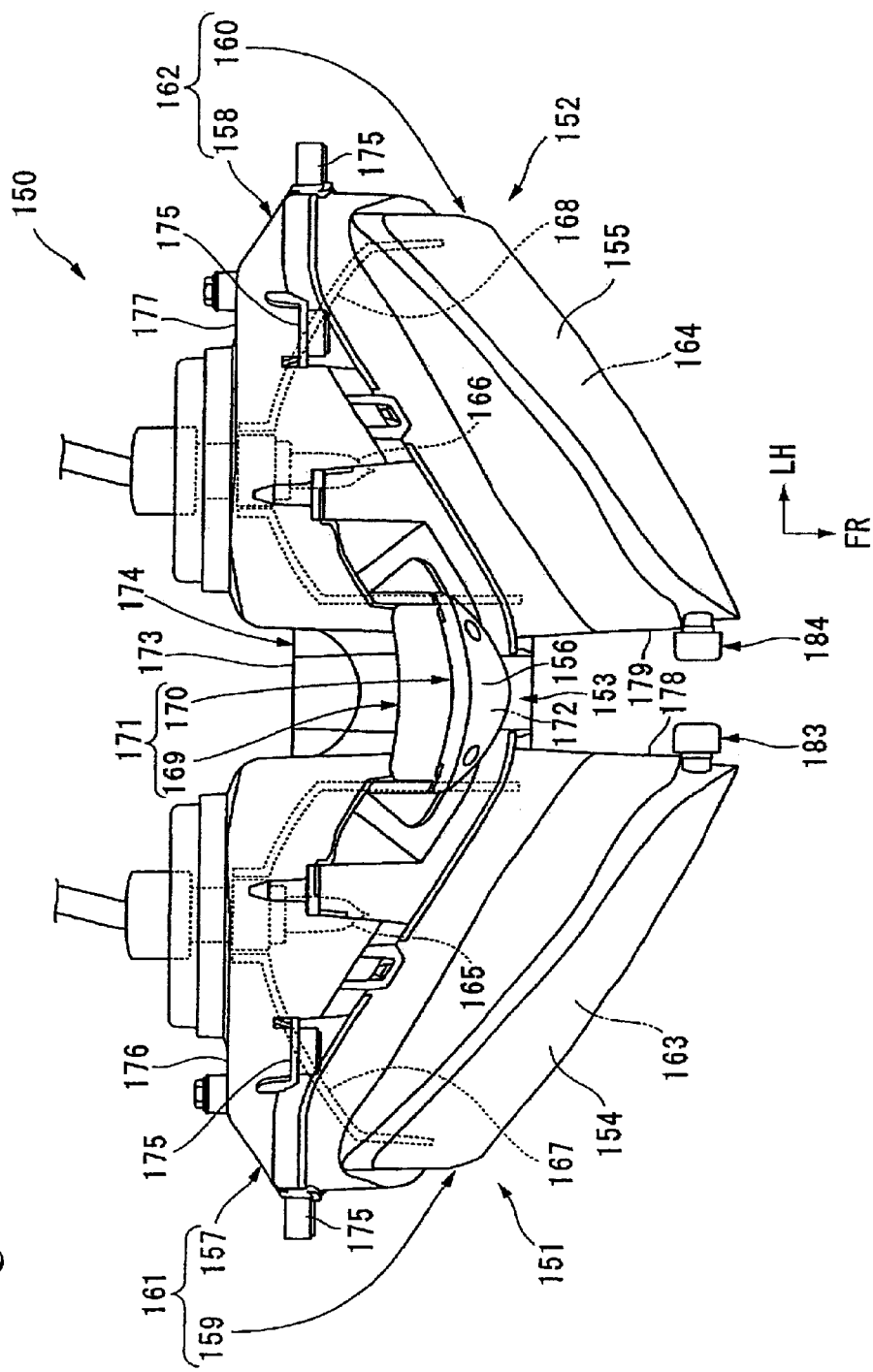
FIG. 7 is a top view showing the headlamp shown in FIG. 6.

Referring to FIGS. 6 and 7, the headlamps 151, 152 have left and right lamp housings 161, 162. The left and right lamp housings 161, 162 mainly include left and right housing main bodies 157, 158 and left and right lens bodies 159, 160. Each of the left and right housing main bodies 157, 158 is open toward the front of the vehicle. The left and right lens bodies 159, 160 are mounted so as to cover openings of the left and right housing main bodies 157, 158, respectively. Left and right bulbs 165, 166 and left and right reflectors 167, 168 arc disposed in left and right lamp chambers 163, 164, respectively, defined individually by the left and right lamp housings 161, 162, respectively. The headlamps 151, 152 are provided on opposite sides relative to the central plane of the vehicle.

Similarly, the position lamp 153 has a central lamp housing 171. The central lamp housing 171 primarily includes a central housing main body 169 and a central lens body 170. The central housing main body 169 is open toward the front of the vehicle. The central lens body 170 is mounted so as to cover the opening of the central housing main body 169. A bulb and a reflector, not shown in FIG. 6 or 7, are disposed inside a central lamp chamber 172 defined by the central lamp housing 171. The position lamp 153 is symmetrical relative to the central plane of the vehicle at the center in the vehicle width direction.

The housing main bodies 157, 158, 169 of the lamps 151, 152, 153 are connected via a connection wall portion 173 disposed across these housing main bodies 157, 158, 169 substantially at a center of the headlamp unit 150. The housing main bodies 157, 158, 169 are thus formed as an integral housing body 174. The housing body 174 includes a plurality of fixing portions 175. The headlamp unit 150 is secured to the vehicle body frame 105 with the front cowl by way of the fixing portions 175 and support stays, not shown.

Each of the lenses 154, 155 of the headlamps 151, 152 is disposed to be inclined such that the more a point therein is located outwardly in the vehicle width direction in a plan view of the lens, the more the point is located rearwardly. Left and right rear wall portions 176, 177 of the housing main bodies 157, 158, respectively, are disposed so as to run substantially in parallel with the vehicle width direction. The lamp chambers 163, 164 of the headlamps 151, 152 may therefore be defined as follows. Specifically, a distance between the lens 154 or 155 and the rear wall portion 176 or 177, at an inboard point in the vehicle width direction, is set to be longer than a distance between the lens 154 or 155 and the rear wall portion 176 or 177 at an outboard point in the vehicle width direction. The lens 156 of the position lamp 153 is curved so as to project forwardly in its plan view.

The lens bodies 159, 160 of the headlamps 151, 152 include left and right outer peripheral wall portions 178, 179 running throughout an entire periphery thereof. The left and right outer peripheral wall portions 178, 179 extend generally rearwardly from outer peripheral edge portions of the lenses 154, 155. Rear end edge portions of the outer peripheral wall portions 178, 179 are joined watertightly to corresponding ones of opening peripheral edge portions of the housing main bodies 157, 158 throughout the entire periphery. The lens bodies 159, 160 are thus integrally joined together with the housing main bodies 157, 158.

Figure 8:
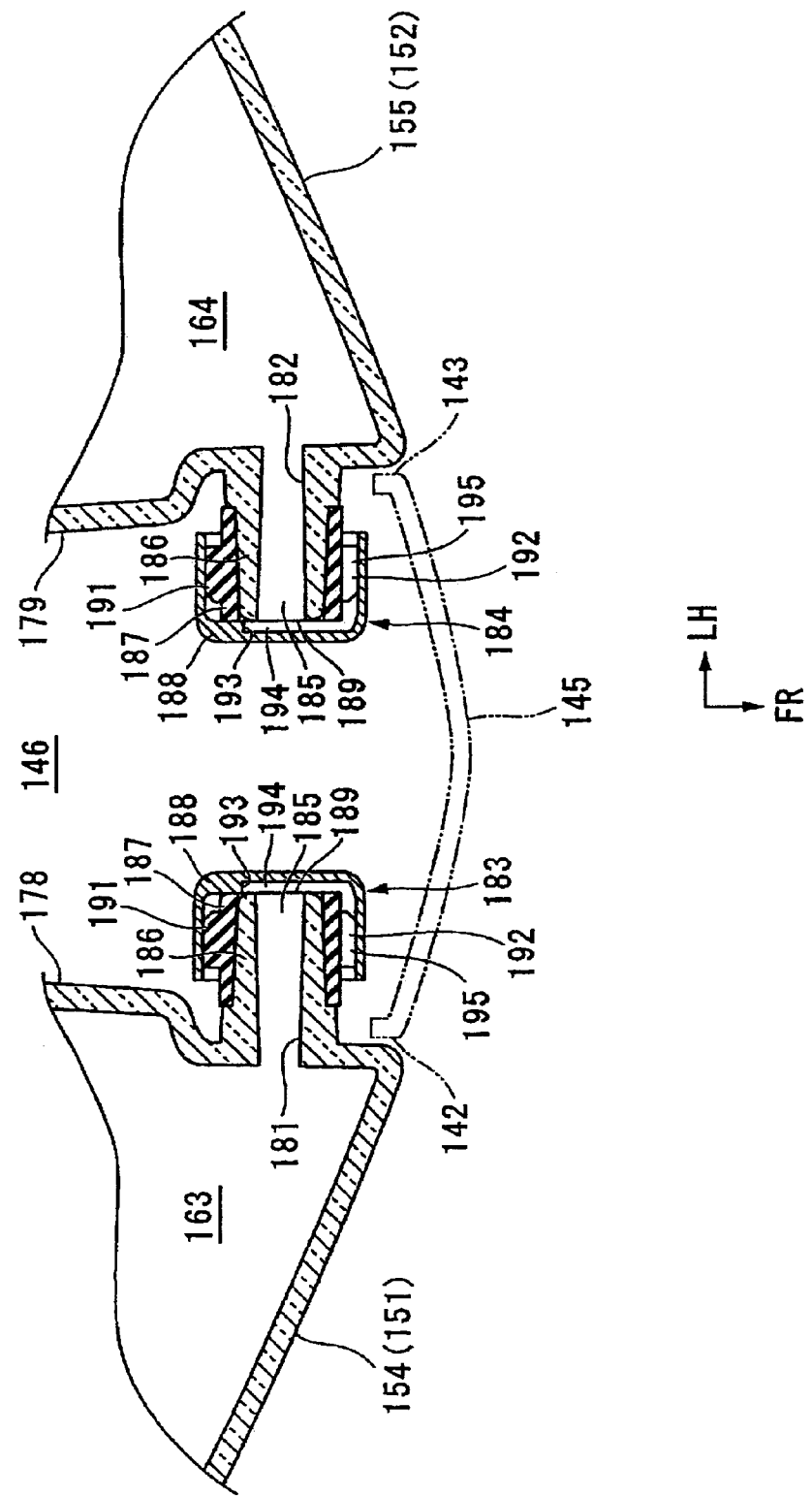
FIG. 8 is a cross sectional view taken along line B B of FIG. 6.

Referring to FIGS. 5 and 8, a lamp to lamp transverse portion 145 is disposed between the left and right openings 142, 143 in the cowl front wall portion 139. The lamp to lamp transverse portion 145 is formed by piercing the openings 142, 143. A central space portion 146 is formed between the headlamps 151, 152. The central space portion 146 is formed by being sandwiched between the connection wall portion 173 and the lamp to lamp transverse portion 145 in the fore aft direction and between inner side portions of the outer peripheral wall portions 178, 179 of the lens bodies 159, 160 in the lateral direction.

The inner side portions of the outer peripheral wall portions 178, 179 of the lens bodies 159, 160 also include left and right air vent holes 181, 182 disposed in portions near the lenses 154, 155, respectively. The left and right air vent holes 181, 182 permit ventilation of the lamp chambers 163, 164, respectively, in order to respond to a need for preventing inner surfaces of the lenses 154, 155 from fogging. Further, left and right air vent valves 183, 184 are provided for the left and right air vent holes 181, 182, respectively. The air vent valves 183, 184 project inwardly in the vehicle width direction (in the central space portion 146) from the air vent holes 181, 182. Relays of various kinds and other electronic and electric parts not shown are disposed in the central space portion 146.

Referring to FIG. 8, the air vent valves 183, 184 are provided on opposite sides, relative to the central plane of the vehicle. In order to form a flow path 185 connecting to a corresponding one of the air vent holes 181, 182 (hereinafter referred to as an in nozzle flow path), a nozzle 186, extending inwardly in the vehicle width direction, is integrally formed with a corresponding one of the outer peripheral wall portions 178, 179. A spacer 187 and a cap 188 are then mounted on a leading end portion of the nozzle 186 so that a labyrinth structure may be formed. An existing moisture permeable waterproof sheet 189 is then fitted to a leading end opening in the nozzle 186.

The spacer 187 is a circular pipe. The spacer 187 includes a thick wall portion 191 formed by increasing thickness diametrically outwardly on an outer peripheral portion thereof. The spacer 187 further includes a groove portion 192 formed by cutting out part of the thick wall portion 191 along an axial direction. The spacer 187 is mounted by being fitted over a leading end portion of the nozzle 186 such that an inner surface of the spacer 187 is in tight contact with an outer surface of the nozzle 186.

The cap 188 includes a cylindrical bottom. The cap 188 is mounted by being fitted over the leading end portion of the nozzle 186 via the spacer 187, such that an inner surface of an outer peripheral portion thereof is in tight contact with an outer surface of the thick wall portion 191 with an opening thereof facing outwardly in the vehicle width direction. The cap 188 may include, as appropriate, a step portion 193 formed on the side of an inner surface of a bottom portion thereof. When the step portion 193 first contacts leading ends of the nozzle 186 and the spacer 187, a bottom portion gap portion 194 is formed between an inner surface of a bottom portion of the cap 188 and the leading ends of the nozzle 186 and the spacer 187.

The bottom portion gap portion 194 communicates with the central space portion 146 (an outside air) via an outer peripheral flow path 195 formed by the groove portion 192 of the spacer 187 and the outer peripheral portion of the cap 188. The bottom portion gap portion 194, the outer peripheral flow path 195, and the in nozzle flow path 185 form a labyrinth structure in areas from the air vent holes 181, 182 to the outside air. As noted earlier, the moisture permeable waterproof sheet 189 is inserted between the bottom portion gap portion 194 and the in nozzle flow path 185. Accordingly, moisture in the lamp chambers 163, 164 can be discharged to an outside and entry of moisture from the outside can be prevented by the labyrinth structure and the moisture permeable waterproof sheet 189.

As described in the foregoing, the headlamp unit 150 according to the second embodiment of the present invention includes the air vent holes 181, 182 provided near the lenses 154, 155 of the headlamps 151, 152, respectively, to prevent the inner surfaces of the lenses 154, 155 from fogging. As compared with an arrangement, in which the housing main bodies 157, 158 include the air vent holes formed away from the lenses 154, 155, ventilation performance of the areas near the inner surfaces of the lenses 154, 155 can be further enhanced without involving any difficulty in designing the air vent holes. Fogging of the inner surfaces of the lenses 154, 155 can thereby be effectively prevented.

In addition, the headlamp unit 150 according to the second embodiment of the present invention includes a pair of left and right headlamps 151, 152 and the air vent holes 181, 182 disposed so as to face an inside of a gap between the lenses 154, 155 (inside the central space portion 146). This makes the specifications of the air vent holes 181, 182 provided for the lenses 154, 155 of the headlamps 151, 152, respectively, identical to each other. The arrangement also enhances performance in laying out the air vent valves 183, 184 for the air vent holes 181, 182 connected, respectively, thereto. Specifically, ventilation performance of the areas near the inner surfaces of the lenses 154, 155 of the headlamps 151, 152 can be enhanced and design of the air vent holes 181, 182 can be facilitated.

A third preferred embodiment of the present invention will now be described.

Figure 9:
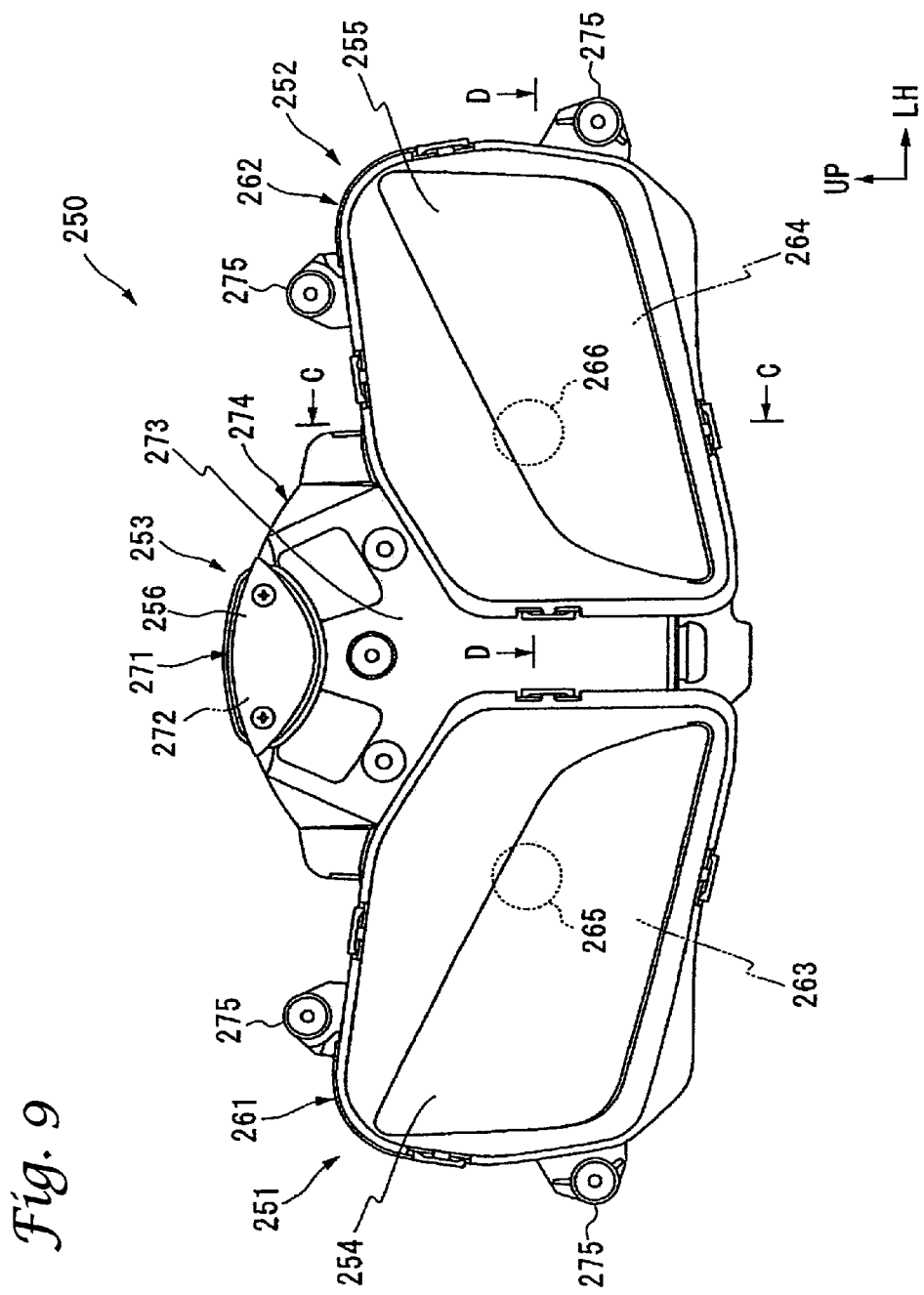
FIG. 9 is a front view showing a headlamp unit according to a third embodiment of the present invention.
Figure 10:
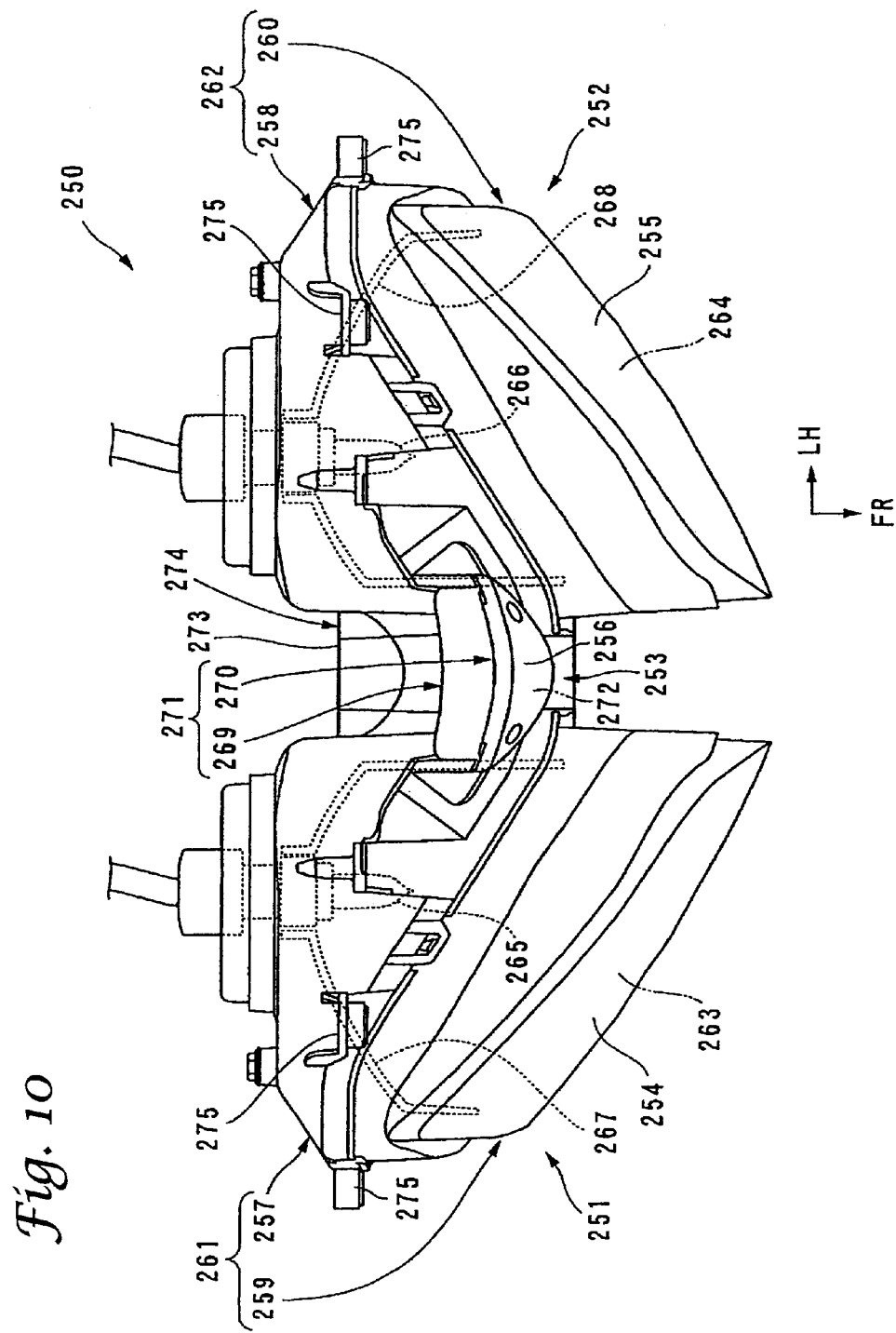
FIG. 10 is a top view showing the headlamp unit shown in FIG. 9.

Referring to FIGS. 9 and 10, a headlamp unit 250 according to the third embodiment of the present invention differs from the headlamp unit 150 according to the second embodiment of the present invention in that the headlamp unit 250 includes moisture conditioning members 294, 295, to be described later, while eliminating the previously described air vent holes 181, 182 and air vent valves 183, 184. To describe by incorporating FIGS. 4 and 5, the moisture conditioning members 294, 295 are disposed on an inside at a front portion of the front cowl 138 instead of the headlamp unit 150.

Referring back to FIGS. 9 and 10, the headlamp unit (vehicle lighting apparatus) 250 includes left and right headlamps 251, 252, and a position lamp 253. The left and right headlamps 251, 252 are disposed on corresponding sides relative to a central plane of the vehicle. The position lamp 253 is disposed upwardly between these two headlamps 251, 252. A cowl front wall portion 139 includes openings 142, 143, 144 that correspond, respectively, to lenses 254, 255, 256 of the lamps 251, 252, 253 (see FIG. 4). The headlamp unit 250 is disposed such that the lenses 254, 255, 256 are exposed towards a front of the vehicle through the openings 142, 143, 144 from an inside of a front cowl 138. In one possible embodiment, the headlamp unit 250 is secured to a vehicle body frame 105 with the front cowl 138.

Each of the lenses 254, 255 for the headlamps 251, 252 is narrower vertically and wider horizontally in its front view. Each lens is a deformed rectangle that slants upwardly toward an outboard end in a vehicle width direction. The cowl front wall portion 139 includes the left and right openings 142, 143 having a shape substantially identical to the shape of each of the lenses 254, 255 (see FIG. 4).

The lens 256 for the position lamp 253 is shaped substantially like a leaf of a tree in its front view. It is to be noted herein that a screen 141 is disposed such that a lower edge shape of the screen 141 is shaped substantially like the letter V in a front view of the screen 141. A lower end portion of the screen 141 is cut off to an inverted V shape to form the center opening 144 having substantially the same shape as the lens 256 in the cowl front wall portion 139 (see FIG. 4).

The headlamps 251, 252 have lamp housings 261, 262. The lamp housings 261, 262 primarily include housing main bodies 257, 258 and lens bodies 259, 260. Each of the housing main bodies 257, 258 is open toward the front of the vehicle. The lens bodies 259, 260 are mounted so as to cover openings of the housing main bodies 257, 258, respectively. Bulbs 265, 266 and reflectors 267, 268 are disposed, respectively, in lamp chambers 263, 264 defined individually by the lamp housings 261, 262, respectively. The headlamps 251, 252 are provided on opposite sides relative to the central plane of the vehicle.

Similarly, the position lamp 253 has a lamp housing 271. The lamp housing 271 primarily includes a housing main body 269 and a lens body 270. The housing main body 269 is open toward the front of the vehicle. The lens body 270 is mounted so as to cover the opening of the housing main body 269. A bulb and a reflector (not shown) are disposed inside a lamp chamber 272 defined by the lamp housing 271.

The position lamp 253 is symmetrical relative to the central plane of the vehicle at the center in the vehicle width direction.

The housing main bodies 257, 258, 269 of the lamps 251, 252, 253 are connected via a connection wall portion 273 disposed across these housing main bodies 257, 258, 269 substantially at a center of the headlamp unit 250. The housing main bodies 257, 258, 269 are thus formed as an integral housing body 274. The housing body 274 includes a plurality of fixing portions 275. The headlamp unit 250 is secured to a vehicle body frame 5 with a front cowl 138 by way of the fixing portions 275 and support stays not shown and the like.

Figure 11:
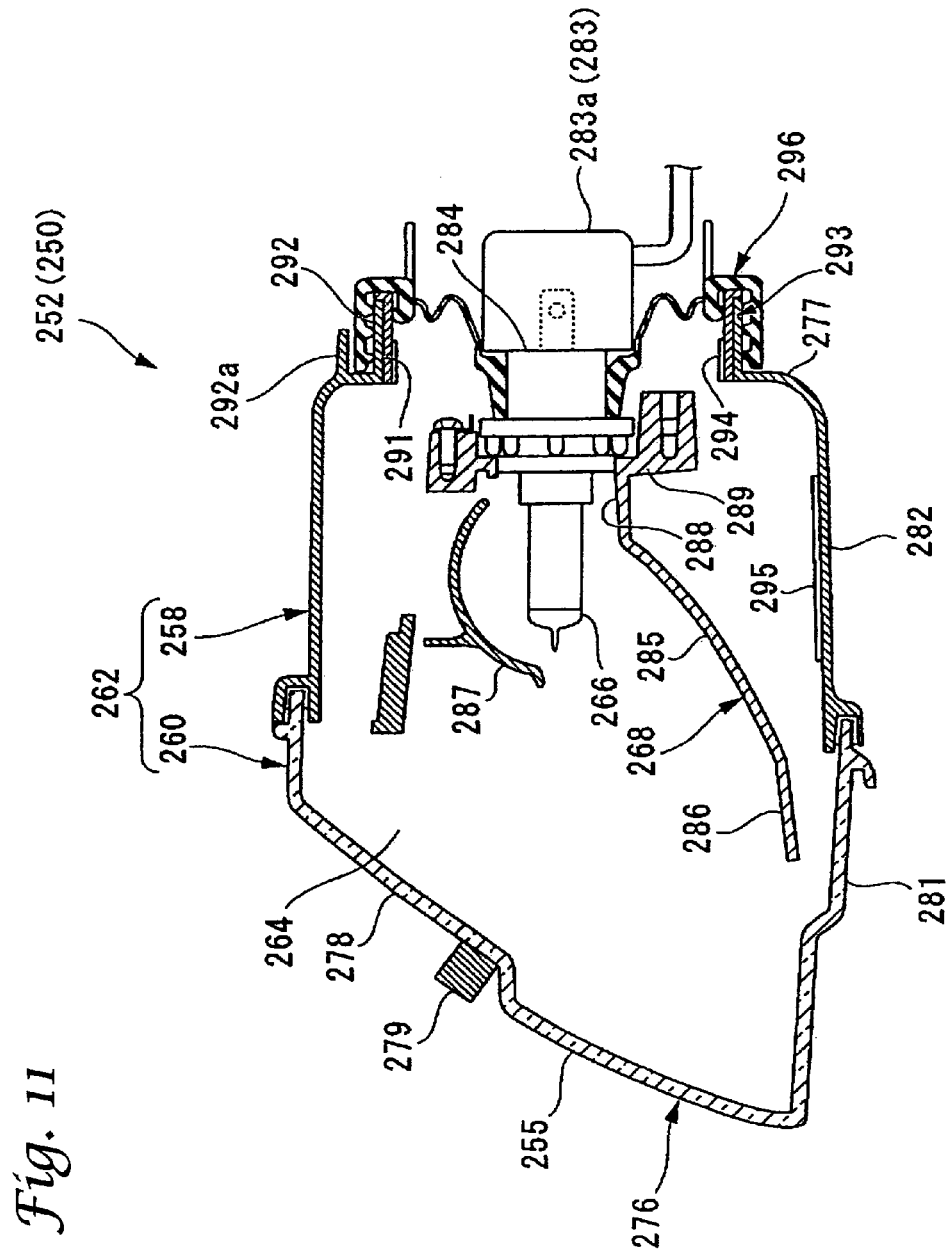
FIG. 11 is a cross sectional view taken along line C C of FIG. 9.
Figure 12:
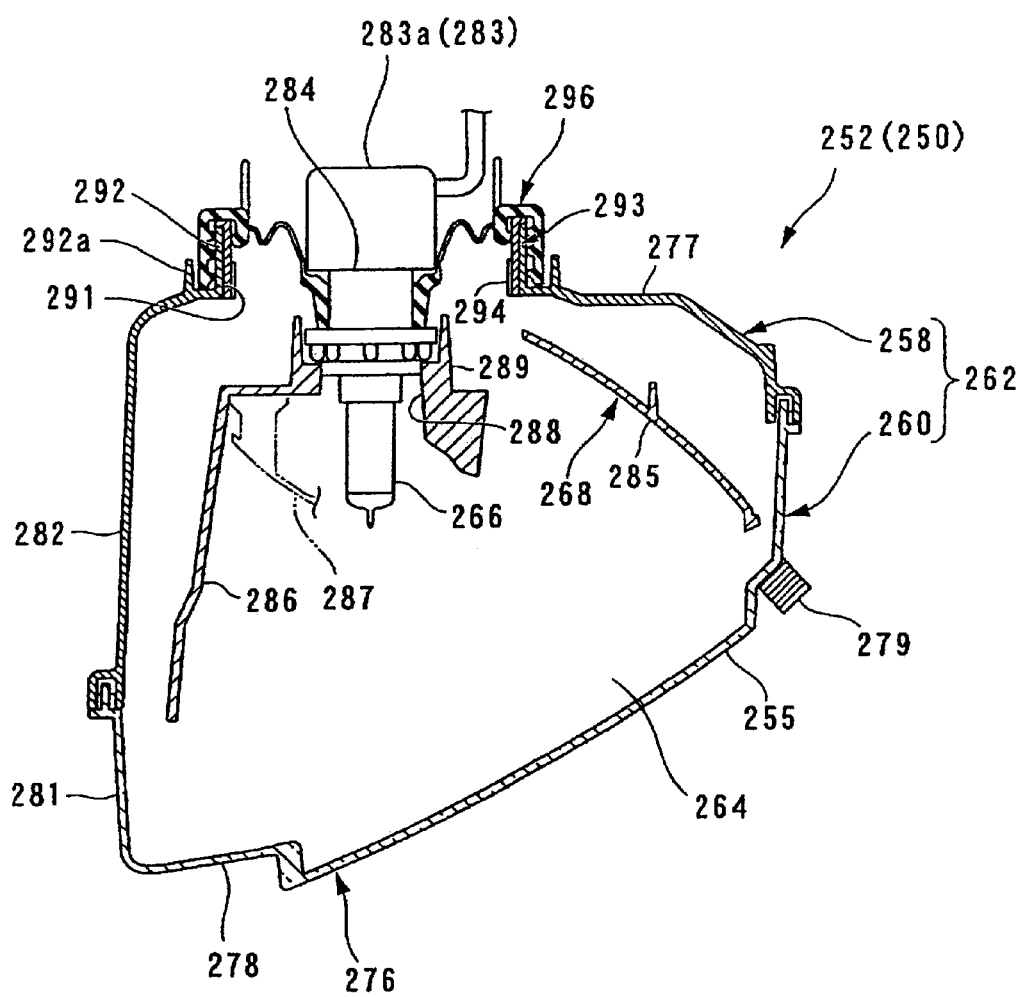
FIG. 12 is a cross sectional view taken along line D D of FIG. 9.

Referring to FIGS. 11 and 12, the left headlamp 252 in the headlamp unit 250 will be described. Descriptions of the right headlamp 251, having the same structure, however reversed from that relative to the left headlamp 252, will be omitted.

The lens 255 in the headlamp 252 is formed as part of a front wall portion 276 (a front wall portion of the lens body 260) of the box shaped lamp housing 262. The front wall portion 276 is disposed to follow along the cowl front wall portion 139 of the front cowl 138. The front wall portion 276 is inclined such that the more a point therein is located outwardly in the vehicle width direction in a plan view of the vehicle, the more the point is located rearwardly. Further, in a side view of the vehicle, the more a point in the front wall portion 276 is located upwardly, the more the point is located rearwardly.

The lamp housing 262 may therefore be defined as follows. Specifically, a distance between the front wall portion 276 and a rear wall portion 277 (a rear wall portion of the housing main body 258) at a leftward point (an inboard point in the vehicle width direction) is set to be longer than a distance between the front wall portion 276 and the rear wall portion 277 at a rightward point (an outboard point in the vehicle width direction). Further, a distance between the front wall portion 276 and the rear wall portion 277 at a lower side point is set to be longer than a distance between the front wall portion 276 and the rear wall portion 277 at an upper side point. As such, the lens 255 is disposed so as to slant to the lower portion on the left hand side of the front wall portion 276. Specifically, the front wall portion 276 includes the lens 255 exposing from the opening 143 in the cowl front wall portion 139 and an overlap portion 278 that overlaps with the cowl front wall portion 139. Reference numeral 279 represents a shock absorbing member disposed between the overlap portion 278 and the cowl front wall portion 139.

The lens 255 of the headlamp 252 is disposed so as to project forward relative to the overlap portion 278 so that a front surface of the lens 255 is substantially flush with a front surface of the cowl front wall portion 139. To state it another way, the overlap portion 278 is disposed so as to change rearwardly relative to the lens 255.

A lens outer peripheral wall portion 281 is extended rearwardly from an outer edge portion of the front wall portion 276 of the lens body 260 throughout an entire periphery of the lens body 260. A housing outer peripheral wall portion 282 is extended forwardly from an outer edge portion of the rear wall portion 277 of the housing main body 258 throughout an entire periphery of the housing main body 258. A rear edge portion of the lens outer peripheral wall portion 281 and a front edge portion of the housing outer peripheral wall portion 282 are watertightly joined together throughout an entire periphery. This integrally unites the lens body 260 with the housing main body 258.

In one possible embodiment, the bulb 266 comprises a standard H4 bulb. The bulb 266 is disposed substantially at a center vertically closer to the side of the rear wall portion 277 of the housing main body 258 in the lamp chamber 264. The bulb 266 is disposed at a lateral position closer to the right (toward the center in the vehicle width direction). A bulb socket 284 for connection to a coupler 283a of a main harness 283 is mounted to a rear portion connector of the bulb 266.

The reflector 268 is shaped like a cup opening forwardly of the vehicle. The reflector 268 includes a light distribution portion 285 and an extension portion 286. The light distribution portion 285 distributes bulb light. The extension portion 286 extends up to a point that covers a joint between the lens body 260 and the housing main body 258.

The reflector 268 comprises a multi reflector having a plurality of cut surfaces formed on a reflection surface of the light distribution portion 285. In one possible embodiment, the lens 255 is a clear lens which has not undergone lens cutting.

More specifically, the bulb light distributed through reflection on the reflection surface of the reflector 268 simply passes through the lens 255 and is radiated toward the front area of the vehicle. Reference numeral 287 represents a shade fitted to the reflector 268 for mainly suppressing an upward distribution of light.

A trailing end portion of the reflector 268 includes a bulb insertion hole 288 that makes the bulb 266 face forward of the light distribution portion 285. The trailing end portion of the reflector 268 also includes a locking portion 289 for holding the reflector 268 by being engaged with a locking flange of the bulb 266.

Figure 13:
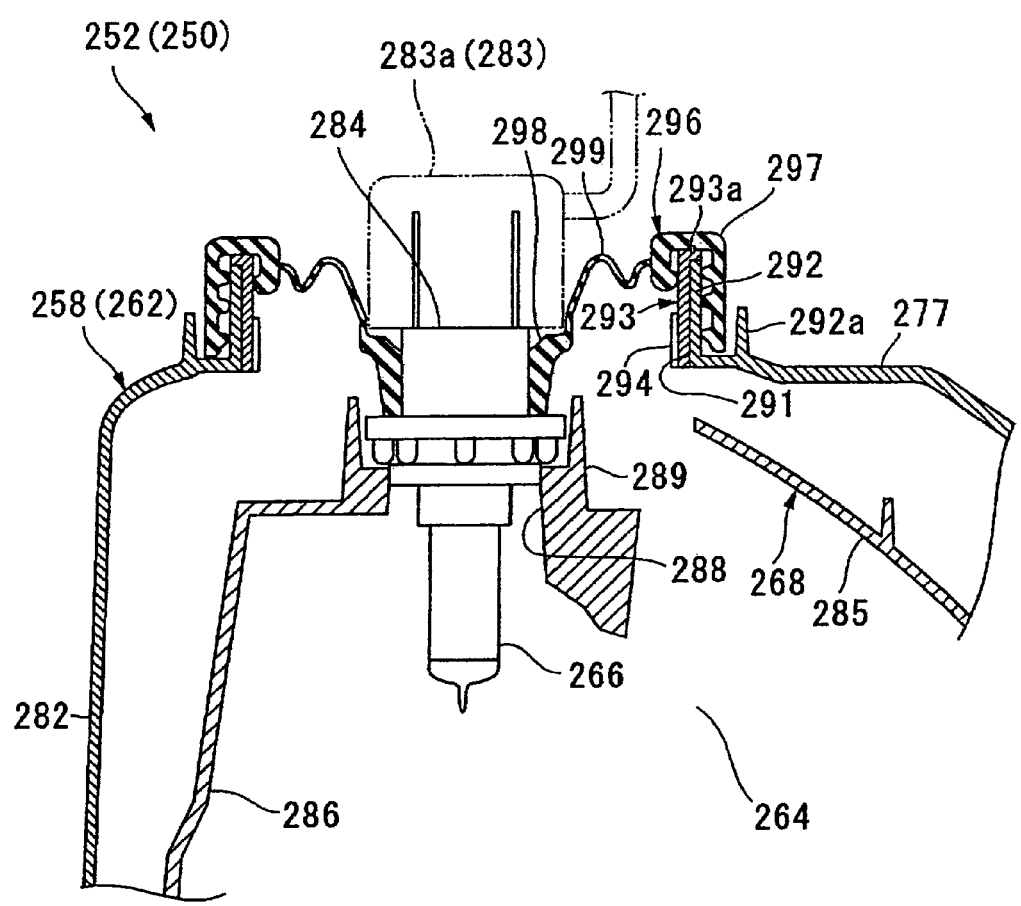
FIG. 13 is an enlarged view showing a principal part of FIG. 12.
Figure 14:
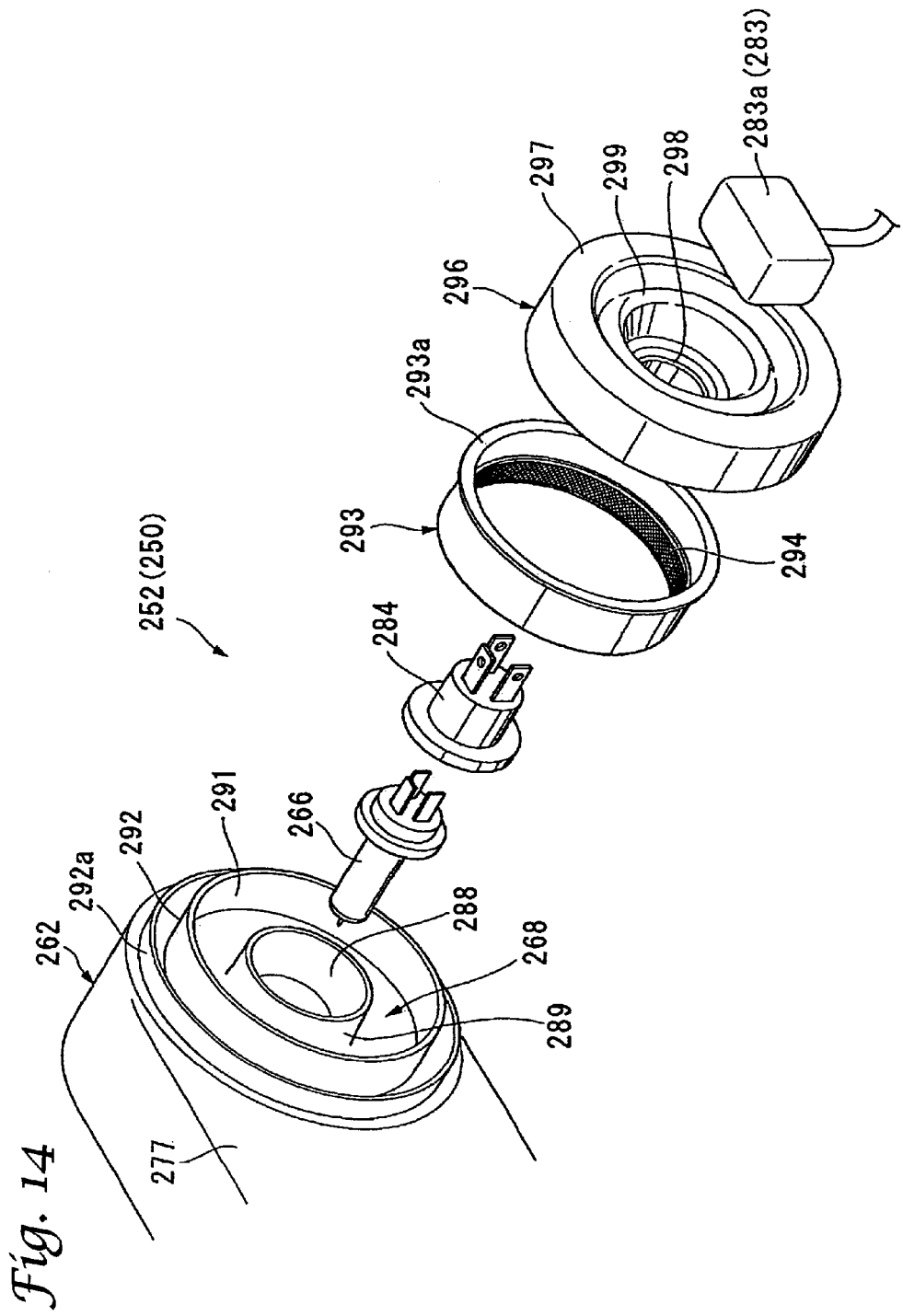
FIG. 14 is an exploded perspective view showing a rear portion of the headlamp unit shown in FIGS. 9 through 13.

Referring to FIGS. 13 and 14, the rear wall portion 277 of the housing main body 258 includes a bulb mounting hole 291 for allowing the bulb 266 to be loaded into, or unloaded from, the lamp chamber 264. The bulb mounting hole 291 is formed relatively large to facilitate loading and unloading operations. The bulb mounting hole 291 is a circle having the bulb 266 at the center thereof in its front view. The bulb mounting hole 291 also includes a collar portion 292 on a peripheral edge portion thereof. The collar portion 292 protruding rearwardly is disposed throughout an entire periphery of the bulb mounting hole 291.

An annular guide ring 293 is removably mounted to the collar portion 292 from the rear. The guide ring 293 is of a cylindrical shape fitted (or screwed) to an inner periphery side of the collar portion 292 from the rear. The guide ring 293 includes a flanged stopper portion 293a for restricting a forward movement formed on a trailing end portion thereof. The moisture conditioning member 294, to be described later, is provided for mounting in the bulb mounting hole 291 via the guide ring 293.

A circular end cap 296 having a diameter substantially identical to the diameter of the bulb mounting hole 291, is mounted to the collar portion 292 and the guide ring 293. The end cap 296 watertightly plugs the bulb mounting hole 291. The end cap 296 is made of, for example, an EPDM (Ethylene Propylene Diene Monomer) or other elastic member. The end cap 296 is disposed such that a cross section, orthogonal to a circumferential direction, is substantially constant. Specifically, the end cap 296 includes an outer peripheral edge portion 297, a cylindrical inner peripheral edge portion 298, and a thin wall diaphragm 299. The outer peripheral edge portion 297 fits over the collar portion 292 and the guide ring 293 so as to sandwich the collar portion 292 and the guide ring 293. The inner peripheral edge portion 298 fits over an outer periphery of the bulb socket 284. The diaphragm 299 extends over the outer peripheral edge portion 297 and the inner peripheral edge portion 298.

The outer peripheral edge portion 297 is shaped substantially into the letter J in the cross section noted earlier. The outer peripheral edge portion 297 is open forwardly and has an outer peripheral side made longer in a forward direction relative to an inner peripheral side. The outer peripheral edge portion 297 further includes, as appropriate, lips that are in tight contact with the collar portion 292 or the guide ring 293, formed on an inside thereof. The rear wall portion 277 of the housing main body 258 also includes a short collar portion 292a, having a predetermined clearance from the collar portion 292, formed on the side of the outer periphery of the collar portion 292. The short collar portion 292a is intended for forming a labyrinth structure with the outer peripheral edge portion 297 and the collar portion 292.

The moisture conditioning member 294 of a sheet form is disposed on a portion of the guide ring 293 on the inner peripheral side, facing the inside of the lamp chamber 264, for example, throughout an entire periphery thereof. In one possible embodiment, the moisture conditioning member 294 is a sheet form mainly including polyacrylic acid sodium salt. The moisture conditioning member 294 is affixed to the inner peripheral side of the guide ring 293.

A moisture conditioning member 295 of the same type as the moisture conditioning member 294 is also affixed to an upper surface side (inside the lamp chamber 264) of a lower wall portion 277a of the lamp housing 262 (see FIG. 11). The moisture conditioning member 295 is disposed rearward of the reflector 268 and, like the moisture conditioning member 294, is not visible from the outside of the lamp housing 262.

As described in the foregoing, the headlamp 252 (the headlamp unit 250) according to the third embodiment of the present invention includes the lamp housing 262 accommodating the bulb 266 and the reflector 268 and the lens 255 disposed on the front surface of the lamp housing 262. The headlamp 252 also includes the moisture conditioning members 294, 295 disposed inside the lamp housing 262.

According to these arrangements, by simply disposing the moisture conditioning members 294, 295 at any arbitrary positions inside the lamp housing 262, reduction in size and weight of the lamp housing 262 can be achieved, while keeping the housing structure simplified without making the structure complicated. At the same time, the arrangements can favorably prevent the inner surface of the lens 255 from fogging due to evaporation of moisture inside the lamp housing 262.

Further, according to the third embodiment of the present invention, the moisture conditioning member 294 is disposed in the bulb mounting hole 291 in the lamp housing 262. This facilitates replacement of the moisture conditioning member 294 and makes the moisture conditioning member 294 hard to see from the outside of the lamp housing 262. Specifically, the arrangement facilitates maintenance and maintains a good antifogging effect, while maintaining a good appearance of the headlamp 252.

Further, the moisture conditioning members 294, 295 are of the sheet form affixed to the inside of the lamp housing 262. This enhances a degree of freedom in disposition of the moisture conditioning members 294, 295 inside the lamp housing 262, while keeping minimal the size and weight of the lamp housing 262. Specifically, fogging of the inner surface of the lens 255 can be effectively prevented and reduction in size and weight of the lamp housing 262 can be enhanced.

Figure 15:
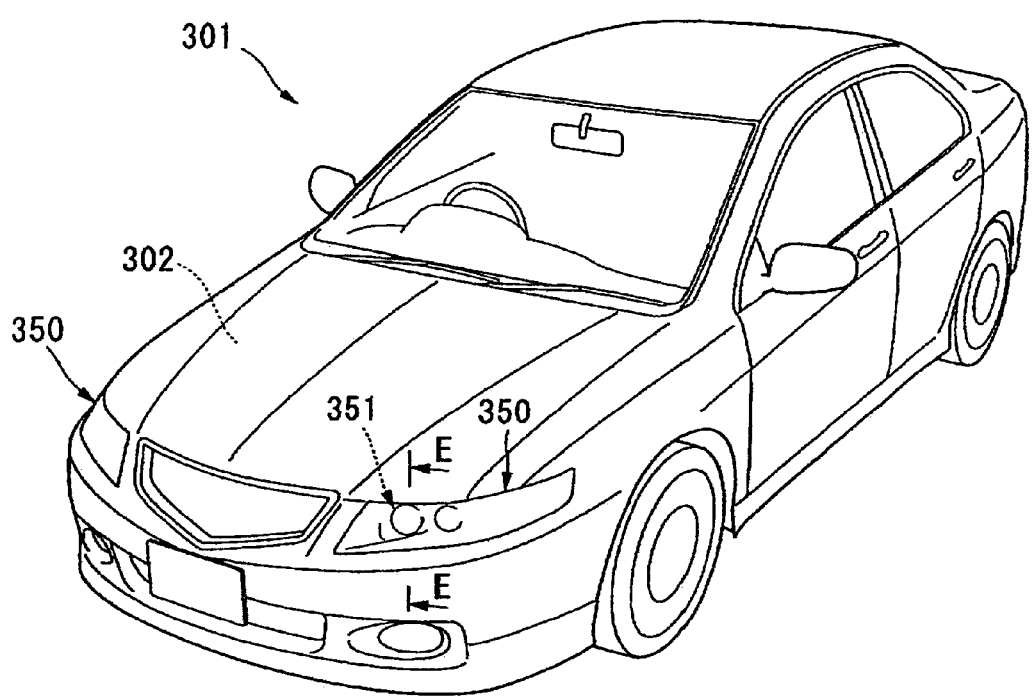
FIG. 15 is a perspective view showing an automobile as an applied example of a third possible embodiment of the present invention.
Figure 16:
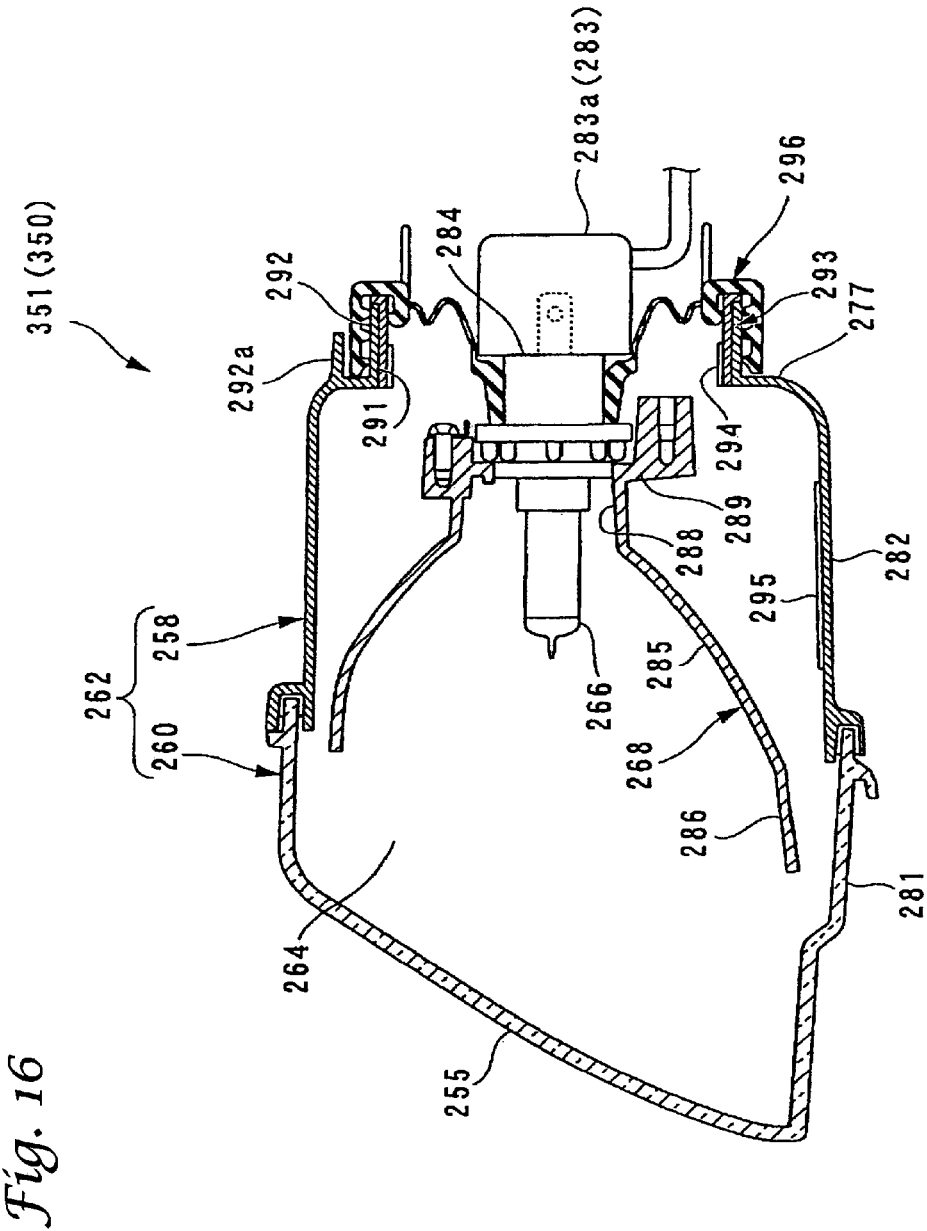
FIG. 16 is a cross sectional view taken along line E E of FIG. 15.

Referring to FIGS. 15 and 16, an applied example of the third embodiment of the present invention, the present invention can be applied to a headlamp unit 350 in a four wheeled automobile 301.

Specifically, each of left and right headlamp units 350 is disposed on either side forward of an engine compartment 302 (at a vehicle body front end portion) at a front portion of the automobile 301. Each of the left and right headlamp units 350 includes a headlamp 351 having the same arrangements as the headlamp 252. In one possible embodiment, the moisture conditioning members 294, 295 are disposed inside the lamp housing 262 in the headlamp 351. In FIG. 16, similar reference numerals are used to denote similar parts corresponding to those found in the third embodiment of the present invention shown in FIG. 11 and descriptions for the same will be omitted.

It is appropriate herein that the moisture conditioning member 294 be disposed in a bulb mounting hole 291 in a lamp housing 262 via a guide ring 293, and the moisture conditioning member 295 be disposed on a lower wall portion 277a of the lamp housing 262. Even if a temperature difference occurs in the left and right headlamps due to an effect from layout or the like of the engine compartment 302, antifogging performance of the inner surface of the lens of the headlamp 351 can be made uniform. To state it differently, an antifogging performance of the lens inner surface can be achieved according to the applicable vehicle.

It is to be noted that the present invention can be implemented in a variety of other manners. For example, in one possible embodiment, the air vent holes (and the air vent valves) of the first embodiment of the present invention are provided near the lenses 56, 57, as done in the second embodiment of the present invention. In another possible embodiment, a space portion enclosed by the lamp front wall portion 55 and the lamp to lamp transverse portion 44 is formed in a portion between the lenses 56, 57, and the air vent holes (and the air vent valves) are disposed so as to face the space portion. The same effects as those derived from the second embodiment of the present invention can thereby be achieved. Moreover, since each of the lamps 52, 53 shares a single lamp housing 51, it becomes possible to prevent the inner surfaces of the lenses 56, 57 from fogging with a single air vent hole (and a single air vent valve), thus simplifying the structure.

In yet another possible embodiment, each of the headlamps 151, 152, as described relative to the second embodiment of the present invention, share a single lamp housing. It then becomes possible to prevent the inner surfaces of the lenses 154, 155 from fogging with a single air vent hole, thus contributing to a simplified structure.

The arrangements in the aforementioned embodiments are only exemplary and the present invention can be implemented in various other arrangements without departing from the spirit thereof.

The invention claimed is:

1. A lighting apparatus with a headlamp unit fitting in a front cowl of a vehicle, comprising:

a pair of lamps arranged horizontally within said headlamp unit and having lamp housings for said lamps with each lamp housing defining a lamp chamber therein, said lamp housings including housing main bodies and lens bodies, said housing main bodies being connected with a connection wall portion;

a pair of lenses, each of said lenses being provided in one of said respective lens bodies, each of said lens bodies including an outer peripheral wall portion running throughout an entire periphery thereof and extending generally rearwardly from an outer peripheral edge portion of the corresponding lens body;

a lamp to lamp transverse portion disposed between said lamp housings at the outer peripheral edge portion of the lens bodies;

a central space portion defined between said lamp housings and providing an outside air environment, said central space portion being formed between the connection wall portion and the lamp to lamp transverse portion in a fore aft direction and between inner side portions of the outer peripheral wall portions of the lens bodies in a lateral direction;

a pair of air vent boles formed on a surface of each housing main body to face the central space portion, each of said pair of air vent holes venting between a different one of said lamp chambers and said central space portion, wherein each of said air vent holes alleviates fogging of an inner surface of said respective lens.

2. The lighting apparatus according to claim 1, further comprising:

an air vent valve, including a labyrinth structure, the air vent valve connecting to and corresponding to each air vent hole, connecting each air vent hole to the outside air environment;

a moisture permeable waterproof sheet fitted between each air vent hole and each air vent valve, wherein moisture within each lamp chamber is discharged to the outside environment and entry of moisture from the outside environment is prevented by the labyrinth structure and the moisture permeable waterproof sheet.

3. The lighting apparatus according to claim 1, wherein each of the air vent holes is disposed near the corresponding lens on the inner side portion of the outer peripheral wall portion near the outer peripheral edge portion of the corresponding lens body.

* * * * *